US011783035B2

United States Patent
Kutt et al.

(10) Patent No.: US 11,783,035 B2
(45) Date of Patent: *Oct. 10, 2023

(54) MULTI-REPRESENTATIONAL LEARNING MODELS FOR STATIC ANALYSIS OF SOURCE CODE

(71) Applicant: Palo Alto Networks, Inc., Santa Clara, CA (US)

(72) Inventors: Brody James Kutt, Santa Clara, CA (US); William Redington Hewlett, II, Mountain View, CA (US); Oleksii Starov, Santa Clara, CA (US); Yuchen Zhou, Newark, CA (US); Fang Liu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,729

(22) Filed: Nov. 15, 2022

(65) Prior Publication Data

US 2023/0074151 A1   Mar. 9, 2023

Related U.S. Application Data

(63) Continuation of application No. 16/779,268, filed on Jan. 31, 2020, now Pat. No. 11,550,911.

(51) Int. Cl.
   *G06F 21/56* (2013.01)
   *G06F 8/41* (2018.01)
   (Continued)

(52) U.S. Cl.
   CPC .............. *G06F 21/563* (2013.01); *G06F 8/42* (2013.01); *G06F 8/75* (2013.01); *G06N 20/00* (2019.01)

(58) Field of Classification Search
   CPC ..... G06F 21/563; G06F 21/564; G06F 21/565; G06F 8/42; G06F 8/75; G06N 20/00
   See application file for complete search history.

(56) References Cited

U.S. PATENT DOCUMENTS

| 10,515,002 B2 | 12/2019 | Takawale |
| 10,637,874 B2 | 4/2020 | Zhao |

(Continued)

FOREIGN PATENT DOCUMENTS

| CA | 3000166 | 10/2018 |
| CN | 107392019 | 11/2017 |

(Continued)

OTHER PUBLICATIONS

Liang et al., SAC: A Novel Framework to Detect Malicious JavaScript via CNNs over AST and CFG, IJCNN 2019, International Joint Conference on Neural Networks, Jul. 14-19, 2009, pp. 1-8.

(Continued)

*Primary Examiner* — Hosuk Song
(74) *Attorney, Agent, or Firm* — Van Pelt, Yi & James LLP

(57) ABSTRACT

Techniques for multi-representational learning models for static analysis of source code are disclosed. In some embodiments, a system/process/computer program product for multi-representational learning models for static analysis of source code includes receiving at a networked device a set comprising one or more multi-representation learning (MRL) models for static analysis of source code; performing a static analysis of source code associated with a sample received at the network device, wherein performing the static analysis includes using at least one MRL model; and determining that the sample is malicious based at least in part on the static analysis of the source code associated with the sample and without performing dynamic analysis of the (Continued)

sample, and in response to determining that the sample is malicious, performing an action based on a security policy.

21 Claims, 20 Drawing Sheets

(51) Int. Cl.
*G06F 8/75* (2018.01)
*G06N 20/00* (2019.01)

(56) References Cited

U.S. PATENT DOCUMENTS

| | | | |
|---|---|---|---|
| 10,754,947 | B2 | 8/2020 | Ferrara |
| 10,762,200 | B1 | 9/2020 | Salem |
| 10,803,166 | B1 | 10/2020 | Terkowitz |
| 10,846,401 | B2 | 11/2020 | Ferrara |
| 10,846,403 | B2 | 11/2020 | Finkelshtein |
| 11,005,860 | B1 | 5/2021 | Glyer |
| 11,200,053 | B2 * | 12/2021 | Smith ............... G06F 11/3466 |
| 11,366,680 | B2 * | 6/2022 | Levin ............... H04L 63/1408 |
| 11,379,577 | B2 * | 7/2022 | Patel ............... G06F 21/566 |
| 11,550,911 | B2 * | 1/2023 | Kutt ............... G06F 8/75 |
| 11,568,055 | B2 * | 1/2023 | Olson ............... G06F 21/577 |
| 2017/0262633 | A1 | 9/2017 | Miserendino |
| 2018/0165273 | A1 | 6/2018 | Nir |
| 2018/0285740 | A1 | 10/2018 | Smyth |
| 2019/0026466 | A1 | 1/2019 | Krasser |
| 2019/0114511 | A1 | 4/2019 | Gao |
| 2019/0138722 | A1 | 5/2019 | Krcál |
| 2021/0056211 | A1 * | 2/2021 | Olson ............... G06N 5/01 |
| 2021/0149788 | A1 | 5/2021 | Downie |
| 2021/0385232 | A1 * | 12/2021 | Kutt ............... G06N 3/045 |

FOREIGN PATENT DOCUMENTS

| | | |
|---|---|---|
| CN | 107683478 | 2/2018 |
| CN | 109933982 | 6/2019 |
| CN | 110659495 | 1/2020 |
| CN | 110704840 | 1/2020 |
| CN | 110472417 | 3/2021 |
| EP | 3407235 | 11/2018 |
| EP | 3534284 | 2/2022 |
| WO | 2018018716 | 2/2018 |

OTHER PUBLICATIONS

Xue et al., Malware Classification Using Probability Scoring and Machine Learning, 2019, pp. 91641-91656.
Anderson et al., EMBER: An Open Dataset for Training Static PE Malware Machine Learning Models, Apr. 16, 2018.
Curtsinger et al., ZOZZLE: Fast and Precise In-Browser JavaScript Malware Detection, 2011.
Johnson et al., Effective Use of Word Order for Text Categorization with Convolutional Neural Networks, Mar. 26, 2015.
Johnson et al., Semi-Supervised Convolutional Neural Networks for Text Categorization via Region Embedding, Nov. 1, 2015.
Ndichu et al., A Machine Learning Approach to Detection of JavaScript-based Attacks using AST Features and Paragraph Vectors, Applied Soft Computing Journal 84, available online Aug. 22, 2019.
Stokes et al., ScriptNet: Neural Static Analysis for Malicious JavaScript Detection, Apr. 1, 2019.
Tufano et al., Deep Learning Similarities from Different Representations of Source Code, MSR'18, May 28-29, 2018.
Wang et al., A Deep Learning Approach for Detecting Malicious JavaScript code, Security and Communication Networks, Security Comm. Networks 2016, 9:1520-1534, Published online Feb. 11, 2016 in Wiley Online Library (wileyonlinelibrary.com). DOI: 10.1002/sec.1441.
Yoon Kim, Convolutional Neural Networks for Sentence Classification, Sep. 3, 2014.
Zhang et al., Character-Level Convolutional Networks for Text Classification, Apr. 4, 2016, pp. 1-9.
Roseline et al., Toward Efficient Malware Detection and Classification using Multilayered Random Forest Ensemble Technique, 2019, IEEE, pp. 1-6.
Saxe et al., A Deep Learning Approach to Fast, Format-Agnostic Detection of Malicious Web Content, 2018, pp. 1-7, (Year: 2018). https://ieeexplore.ieee.org/stamp/stamp.jsp?tp=&arnumber=8424626.

\* cited by examiner

Test set FNR

| FPR ≤ | Chars | Hand-crafted | Tokens | Chars + hand-crafted | Tokens + hand-crafted | Chars + tokens | Chars + tokens + hand-crafted |
|---|---|---|---|---|---|---|---|
| 2% | 0.137% | 0.355% | 0.191% | 0.105% | 0.171% | 0.061% | 0.067% |
| 1% | 0.197% | 0.437% | 0.323% | 0.171% | 0.237% | 0.099% | 0.095% |
| 0.1% | 0.732% | 1.021% | 0.847% | 0.518% | 0.568% | 0.320% | 0.334% |
| 0.01% | 3.044% | 2.578% | 2.701% | 2.338% | 2.373% | 1.281% | 1.287% |
| 0.001% | 15.934% | 12.694% | 15.168% | 19.496% | 13.642% | 7.040% | 6.899% |

FIG. 11

MULTI-REPRESENTATIONAL LEARNING MODELS FOR STATIC ANALYSIS OF SOURCE CODE

CROSS REFERENCE TO OTHER APPLICATIONS

This application is a continuation of U.S. patent application Ser. No. 16/779,268, entitled MULTI-REPRESENTATIONAL LEARNING MODELS FOR STATIC ANALYSIS OF SOURCE CODE filed Jan. 31, 2020, which is incorporated herein by reference for all purposes.

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 11 is a table illustrating a test set of false negative rates for the generated model for performing multi-representational learning applied to malware classification of JavaScript samples in a test set of data.

DETAILED DESCRIPTION

Figure 1:
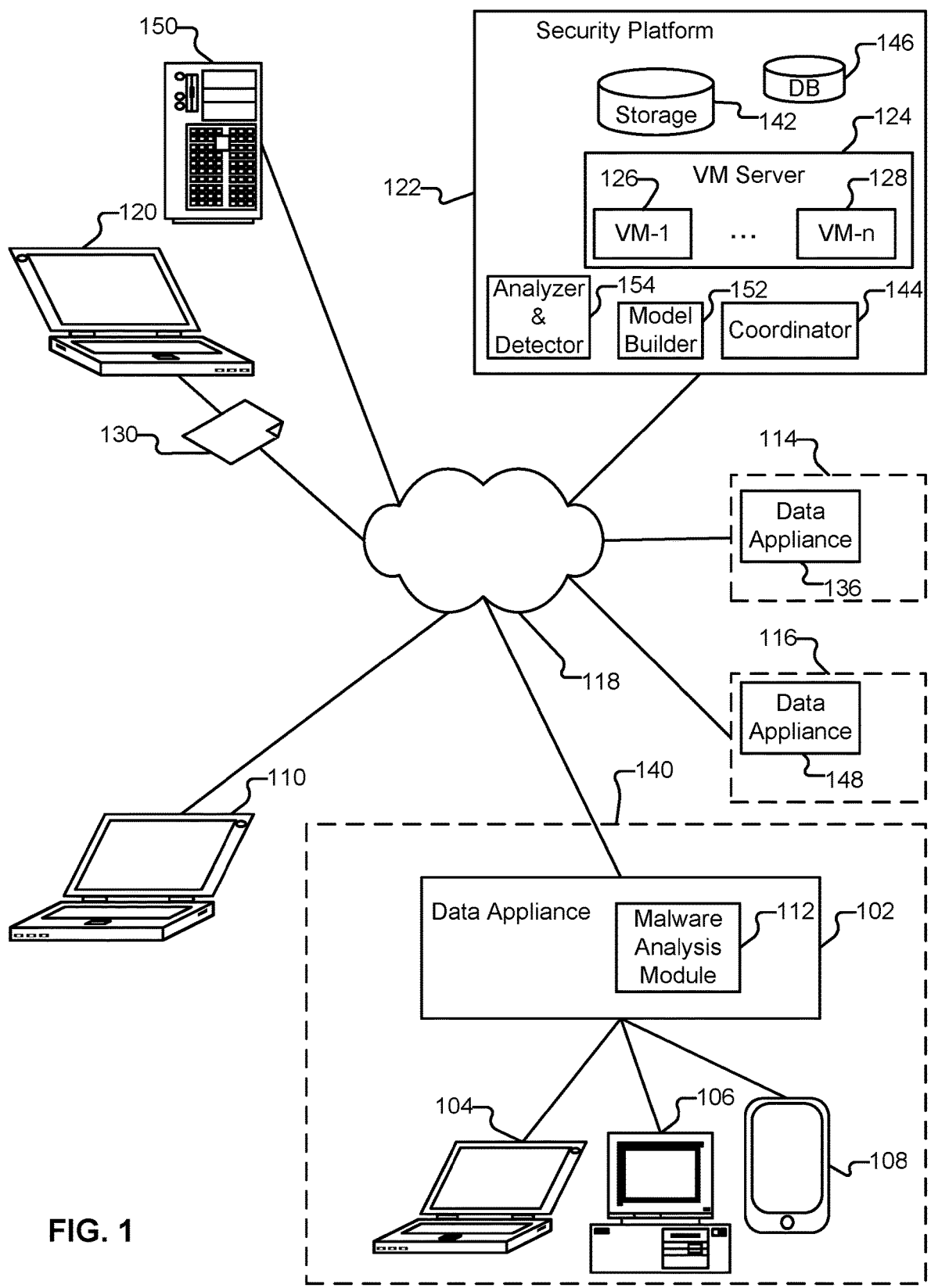
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while feature vectors are described herein as being generated for detecting malicious JavaScript source code, techniques described herein can also be used in various embodiments to generate feature vectors for other types of source code (e.g., HTML and/or other programming/scripting languages).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
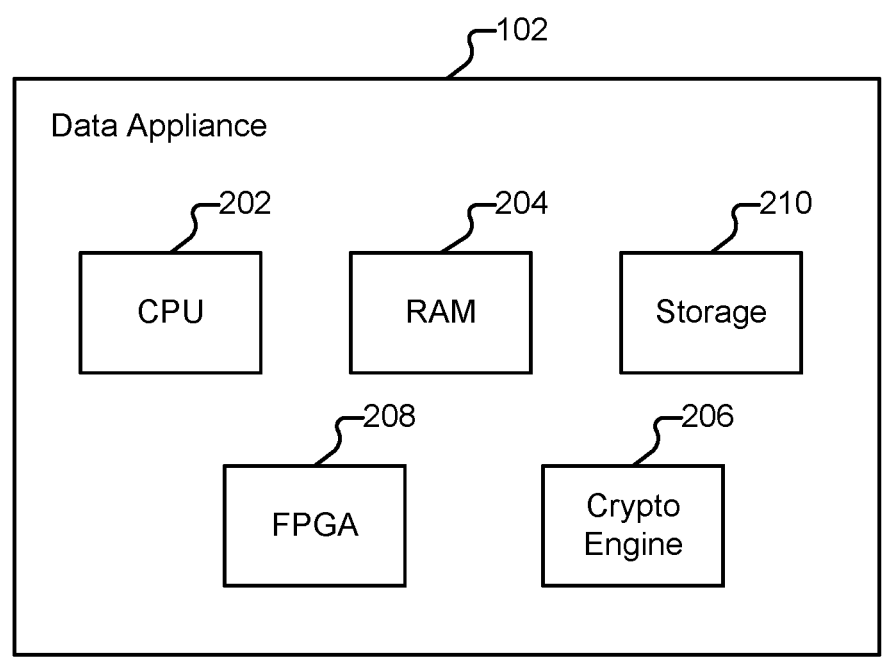
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
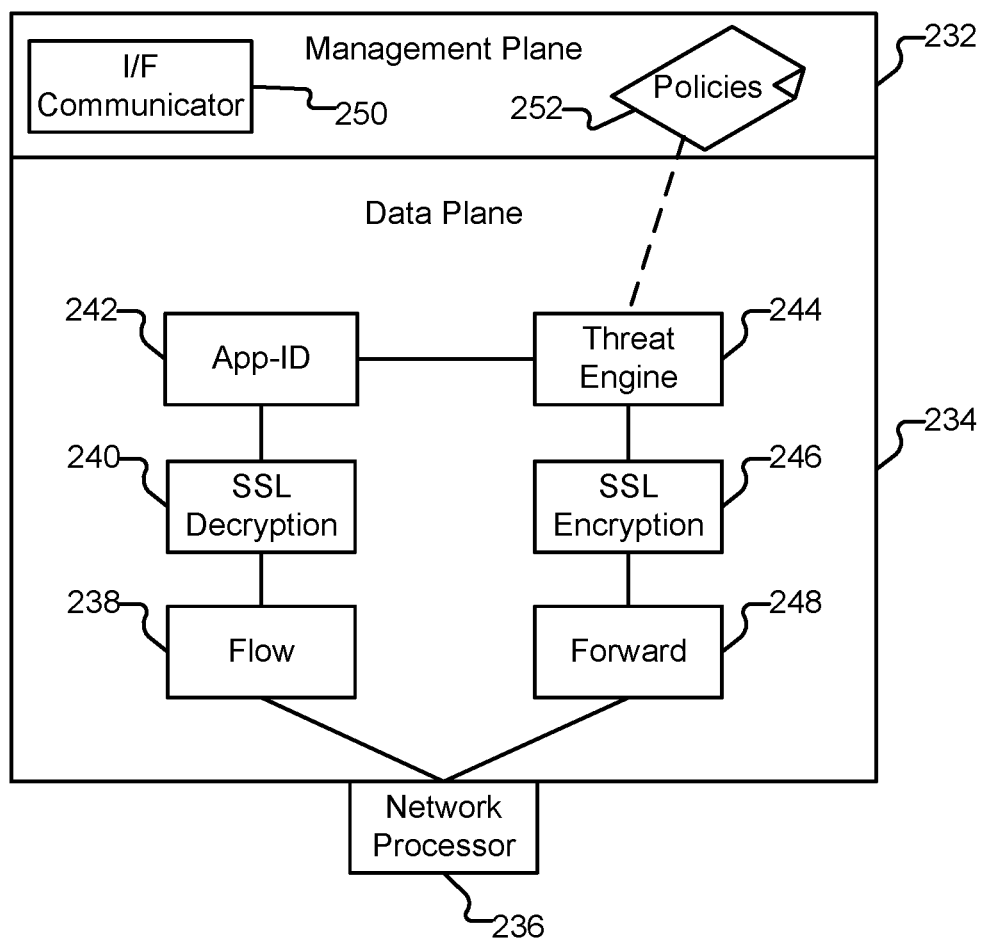
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization (e.g., tokenization is further described below), and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, suppose a malicious individual (using system 120) has created malware 130. The malicious individual hopes that a client device, such as client device 104, will execute a copy of malware 130, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or web site download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). As will be described in more detail below, security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm.

As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). As will be described in more detail below, platform 122 can also make available other types of information, such as machine learning models (e.g., based on feature vectors) that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

IV. Analyzing Samples Using Static/Dynamic Analysis

Figure 3:
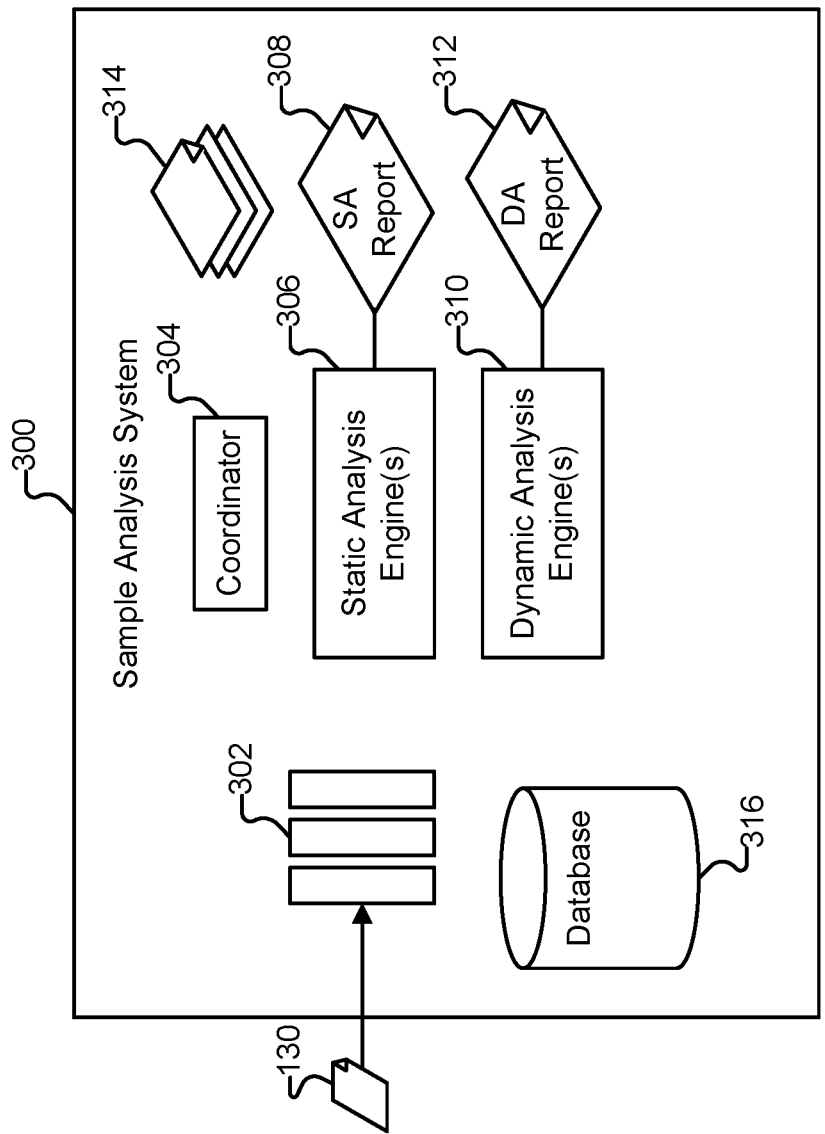
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and log cat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

1. Additional Detail on the Threat Engine

In various embodiments, data appliance 102 includes a threat engine 244. The threat engine incorporates both protocol decoding and threat signature matching during a respective decoder stage and pattern match stage. Results of the two stages are merged by a detector stage.

When data appliance 102 receives a packet, data appliance 102 performs a session match to determine to which session the packet belongs (allowing data appliance 102 to support concurrent sessions). Each session has a session state which implicates a particular protocol decoder (e.g., a web browsing decoder, an FTP decoder, or an SMTP decoder). When a file is transmitted as part of a session, the applicable protocol decoder can make use of an appropriate file-specific decoder (e.g., a PE file decoder, a JavaScript decoder, or a PDF decoder).

Figure 4:
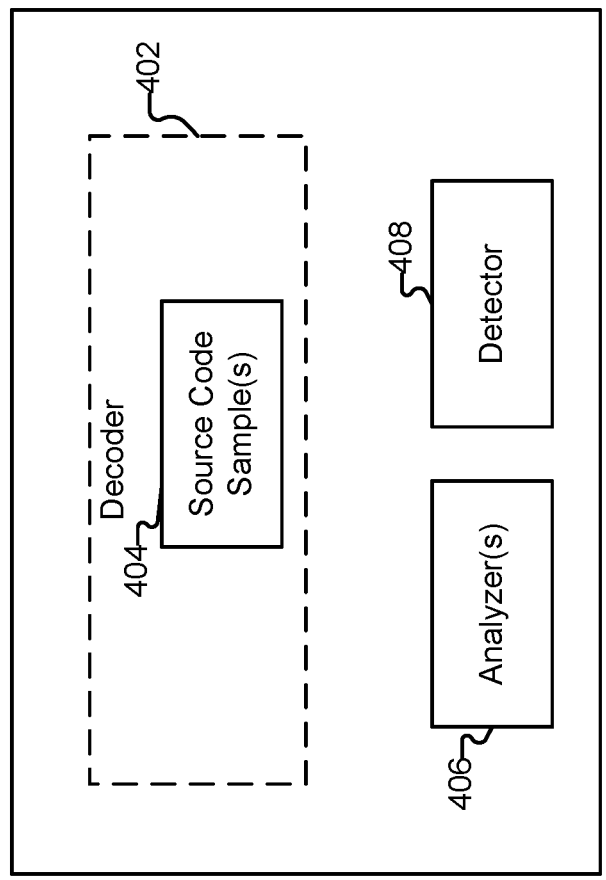
FIG. 4 illustrates portions of an example embodiment of a threat engine.

Portions of an example embodiment of threat engine 244 are shown in FIG. 4. In one embodiment, for a given session, decoder 402 walks the traffic byte stream, following the corresponding protocol and marking contexts. One example of a context is an end-of-file context (e.g., encountering </script> while processing a JavaScript file). Decoder 402 can mark the end-of-file context in the packet, which can then be used to trigger execution of the appropriate model using the file's observed features. In some cases (e.g., FTP traffic), explicit protocol-level tags may not be present for decoder 402 to identify/mark context with. In another embodiment, decoder component 402 is configured to determine a file type associated with each of the files in source code sample(s) 404 and can decode the files for performing static analysis using an MRL model(s) as described further below. As will also be described in more detail below, in various embodiments, decoder 402 can use other information (e.g., file size as reported in a header) to determine when feature extraction of a file should end (e.g., the overlay section begins) and execution using an appropriate model should be commenced (e.g., as further described below, decoder 402 can determine a file type associated with source code sample(s) 404, and then select an appropriate MRL model for that type of source code associated with that file type, such as a JS MRL model for JS files, an HTML MRL model for HTML files, etc., and analyzer 406 can perform static analysis of the sample using the appropriate MRL model(s)).

Threat engine 244 also includes an analyzer component 406 for performing static analysis of source code sample(s) 404 using a selected MRL model(s) as further described below. A detector component 408 (e.g., using target feature vectors of the selected MRL model(s)) determines whether to classify each of the analyzed source code sample(s) 404 as malicious or benign (e.g., based on a threshold score) as will also be further described below. As one example, analyzer(s) 406 and detector 408 can be implemented by data appliance 102 and/or by a security agent/software executed on client 110 (e.g., and as also similarly shown in FIG. 1, by analyzer & detector 154 of security platform 122) using the disclosed techniques for MRL models applied to malware classification based on a static analysis of source code samples. Detector 408 processes outputs provided by decoder 402 and analyzer(s) 406 to take various responsive actions (e.g., based on a security policy/rule(s)).

V. Inline Malware Detection

Returning to the environment of FIG. 1, millions of new malware samples may be generated each month (e.g., by nefarious individuals such as the operator of system 120, whether by making subtle changes to existing malware or by authoring new malware). Accordingly, there will exist many malware samples for which security platform 122 (at least initially) has no signature. Further, even where security platform 122 has generated signatures for newly created malware, resource constraints prevent data appliances, such as data appliance 102, from having/using a list of all known signatures (e.g., as stored on platform 122) at any given time.

Sometimes malware, such as malware 130, will successfully penetrate network 140. One reason for this is where data appliance 102 operates on a "first-time allow" principle. Suppose that when data appliance 102 does not have a signature for a sample (e.g., sample 130) and submits it to security platform 122 for analysis, it takes security platform 122 approximately five minutes to return a verdict (e.g., "benign," "malicious," "unknown," etc.). Instead of blocking communications between system 120 and client device 104 during that five minute time period, under a first-time allow principle, the communication is allowed. When a verdict is returned (e.g., five minutes later), data appliance 102 can use the verdict (e.g., "malicious") to block subsequent transmissions of malware 130 to network 140, can block communications between system 120 and network 140, etc. In various embodiments, if a second copy of sample 130 arrives at data appliance 102 during the period data appliance 102 is awaiting a verdict from security platform 122, the second copy (and any subsequent copies) of sample 130 will be held by system 120 pending a response from security platform 122.

Unfortunately, during the five minutes that data appliance 102 awaits a verdict from security platform 122, a user of client device 104 could have executed malware 130, potentially compromising client device 104 or other nodes in network 140. As mentioned above, in various embodiments, data appliance 102 includes a malware analysis module 112. One task that malware analysis module 112 can perform is inline malware detection. In particular, and as will be described in more detail below, as a file (such as sample 130) passes through data appliance 102, machine learning techniques can be applied to perform efficient analysis of the file on data appliance 102 (e.g., in parallel with other processing performed on the file by data appliance 102) and an initial maliciousness verdict can be determined by data appliance 102 (e.g., while awaiting a verdict from security platform 122).

Various difficulties can arise in implementing such analysis on a resource constrained appliance such as data appliance 102. One critical resource on appliance 102 is session memory. A session is a network transfer of information, including the files that appliance 102 is to analyze in accordance with techniques described herein. A single appliance might have millions of concurrent sessions, and the memory available to persist during a given session is extremely limited. An example technical challenge in performing machine learning (ML) based analysis on a data appliance such as data appliance 102 is that, due to such memory constraints, data appliance 102 may not be able to execute certain ML models that require significant memory and/or processor/CPU resources for execution of such ML models. A machine learning approach used by data appliance 102 will accordingly need to accommodate resource constraints in various embodiments.

VI. Techniques for Multi-Representational Learning Applied to Malware Classification Samples (e.g., files that are also referred to as malware samples) that include source code can be analyzed to attempt to determine whether the sample is malicious or benign. Generally, approaches to this problem can be categorized into dynamic analysis and static analysis as similarly described above. Dynamic analysis (e.g., actually executing the program in a controlled environment) is often very accurate, but it is very costly and is not very scalable. Static analysis (e.g., which is to use only the source code textual information) can be very fast, but it is a much more difficult problem for a computer to solve given that the computer must be able to guess if the program does something malicious without actually executing the source code sample.

What are needed are new and improved techniques to effectively and efficiently perform static analysis of a sample that includes source code (e.g., JavaScript, HTML, and/or other programming/scripting languages).

Accordingly, new and improved techniques for effectively and efficiently performing static analysis of source code samples are disclosed. For example, the disclosed techniques can effectively and efficiently detect malware source code based on a static analysis (e.g., a classification based on the static analysis) without having to spend the computing time and resources of executing the source code sample (e.g., do not have to perform dynamic analysis).

Generally, there are three existing approaches for static detection in the literature and in practice today. The first approach is the simplest and least generalizable approach, which is to maintain a database of uniquely identifying program signatures and do lookup on that knowledge base. This first approach is easily circumvented, and does not detect novel threats and is very costly in terms of memory and maintaining as current. A second approach is to identify a set of features (e.g., hand-crafted features by malware analysts) to calculate on source code samples (e.g., programs/scripts), which are then fed into any number of the hundreds of classification strategies that exist (e.g., Random Forests or other classification strategies). The shortcomings of this second approach are that it is very difficult to determine whether one feature is better than another feature and whether one classification algorithm is better than another (e.g., as such is often problem/domain dependent). In addition, updating the features can be time and computationally costly and often not intuitive. Also, if the features are ever known by the adversary, it often becomes very easy to circumvent this second approach. A third approach is to attempt to utilize automatically learned features that have the potential to perform much better than hand-crafted features. Some efforts have attempted to apply auto feature learning approaches to source code particularly in the realm of Deep Learning applied to natural language processing (NLP).

Figure 5:
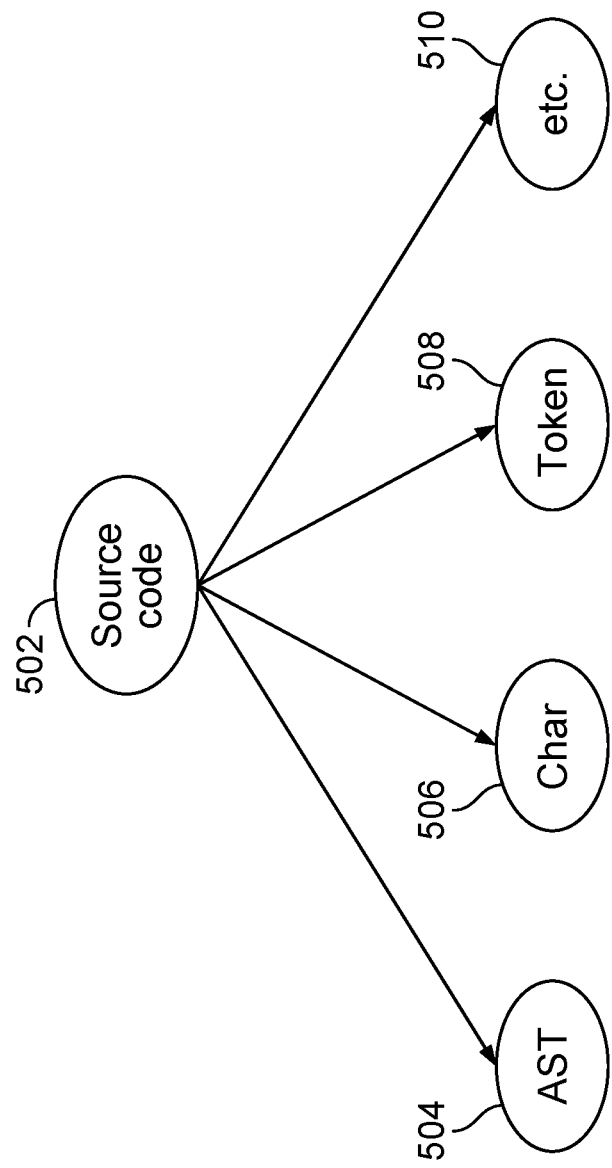
FIG. 5 illustrates an abstraction to different levels/layers of source code.

However, as will be described below, we have developed techniques that provide superior static analysis and classification performance for source code samples without having to perform the more computationally expensive operations associated with performing a dynamic analysis of source code samples. These new and improved techniques are generally based on an observation that source code is a complex data type that takes on different qualities at different levels of abstraction. As such, the source code can be abstracted to different levels/layers of abstraction as shown, for example, in FIG. 5. As shown in this example, a lowest abstraction of source code 502 is into a stream of individual characters as shown at 506 (e.g., using a python script to parse characters from the source code sample and map them to unique (integer) classes). A more abstract level/layer is a stream of tokens as shown at 508 (e.g., to abstract a sample that includes JavaScript (JS) into a sequence of token classes, in an example implementation of a tokenizer component implemented in Python, Acorn can be used for a JS tokenization process, which is available open source at https://github.com/acornjs/acorn; these Acorn tokens, such as keywords, variables, punctuation, IDs and strings, etc., are then mapped to unique (integer) classes, e.g., using a Python script, which is based on observations of frequency of such across the training data such as appearing in at least 1% of the sample data which resulted in approximately 3,000 classes in an example implementation for a JS model). An even more abstract level/layer is provided with an Abstract Syntax Tree (AST) as shown at 504 (e.g., a component for generating an AST from a JS sample is implemented in Python, and an example AST implementation is further described below with respect to FIG. 7B). Finally, additional levels/layers of abstraction can also be extracted from source code sample 502 as shown at 510 (e.g., hand-crafted features and/or other layers of abstraction).

In an example implementation, each of these abstract representations of the source code sample/file can be stored in an array for processing, such as a (constant size) NumPy array (.npz) for each of the pre-processed benign and malicious source code samples for building the MRL model(s) using the disclosed techniques as will be further described below. As will also be further described below, the disclosed techniques can derive complimentary features from these different representations of the source code, which are often orthogonal to each other and can lead to more accurate models than simply performing analysis of single representations of the source code sample in isolation. The disclosed techniques that utilize these different representations of the source code, which are orthogonal to each other and which can lead to more accurate models than looking at single representations in isolation, are referred to herein as multi-representational learning (MRL) for the machine learning (ML) generated models for classifying source code samples as malicious or benign based on a static analysis as will be further described below.

In some embodiments, techniques for performing multi-representational learning applied to malware classification for an effective and efficient static classification of source code malware are disclosed. As will be further described below in greater detail, the disclosed techniques include extracting features from multiple source code samples in parallel at different levels/layers of abstraction to facilitate an efficient and accurate set of features that can be used to generate an MRL model(s) for static classification of source code malware. Extracted sets of features can then be concatenated to create a feature vector (e.g., a target feature vector) for efficiently performing static classification of malware. In an example implementation, the disclosed techniques can be effectively and efficiently performed to perform static classification of, for example, JavaScript samples (e.g., to detect malicious JavaScript based on the static analysis with an ultra-low false positive (FP) rate (FPR), such as a FPR of 0.01% FPR or lower). As will be apparent to one of ordinary skill in the art in view of the disclosed embodiments, the disclosed techniques can be similarly applied to any programming language (e.g., HTML in which abstract layers may include AST, tokens, etc., and/or the disclosed techniques can be similarly applied to various other scripting/programming languages in which the abstractions may vary based on the scripting/programming language being modeled for source code malware classification using the disclosed techniques). The techniques for building/generating these MRL models for efficiently and effectively performing malware classification will be described further below with respect to various embodiments.

In some embodiments, a system/process/computer program product for multi-representational learning applied to malware classification includes receiving training data, wherein the training data includes a set of source code files for training a multi-representational learning (MRL) model for classifying malicious source code and benign source code based on a static analysis; generating a first feature vector based on a set of characters extracted from the set of source code files; generating a second feature vector based on a set of tokens extracted from the set of source code files; and performing an ensemble of the first feature vector and the second feature vector to form a target feature vector for classifying malicious source code and benign source code based on the static analysis.

In some embodiments, a system/process/computer program product for multi-representational learning applied to malware classification includes storing on a networked device a set comprising one or more multi-representation learning (MRL) models for static analysis of source code; performing a static analysis of source code associated with a sample received at the network device, wherein performing the static analysis includes using at least one stored MRL model; and determining that the sample is malicious based at least in part on the static analysis of the source code associated with the received sample, and in response to determining that the sample is malicious, performing an action based on a security policy.

For example, the disclosed techniques address a need to preemptively, cheaply, autonomously, and intelligently identify malicious source code files (e.g., JavaScript, HTML, etc.) in a scalable manner to protect millions of devices/users on the modern web/Internet and/or across enterprise computing environments.

In one embodiment, the disclosed techniques utilize analysis on multiple representations of JavaScript source code to classify samples/files as either malicious or benign. Specifically, we train a supervised statistical model to automatically extract learned features, and perform classification on those features, from three different representations of the JavaScript source code at different levels of abstraction: (1) a stream of characters; (2) a stream of tokens; and (3) an Abstract Syntax Tree (AST). The disclosed statistical model can produce a malicious class score on unseen JavaScript files with unknown class labels. A threshold on the malicious class score is imposed to predict class membership and, equivalently, maliciousness. As such, the disclosed techniques can effectively and efficiently extract complimentary features from various source code representations at different levels of abstraction of the source code. Each source code representation is shown in our work to be utilized by the model to substantially increase performance compared to using only a single representation as is the more common, typical practice for malware detection approaches.

These and other embodiments for performing multi-representational learning applied to malware classification will be further described below.

A. Machine Learning Models

As will be described in more detail below, in various embodiments, security platform 122 provides a set of machine learning models to data appliance 102 for data appliance 102 to use in conjunction with malware detection based on a static analysis. The models incorporate features (e.g., feature vectors for static detection of source code malware) determined to be corresponding to malicious files. Example types of such classification models for static detection of source code malware (e.g., for efficiently analyzing JavaScript, HTML, or other types of source code) will be further described below.

Figure 6A:
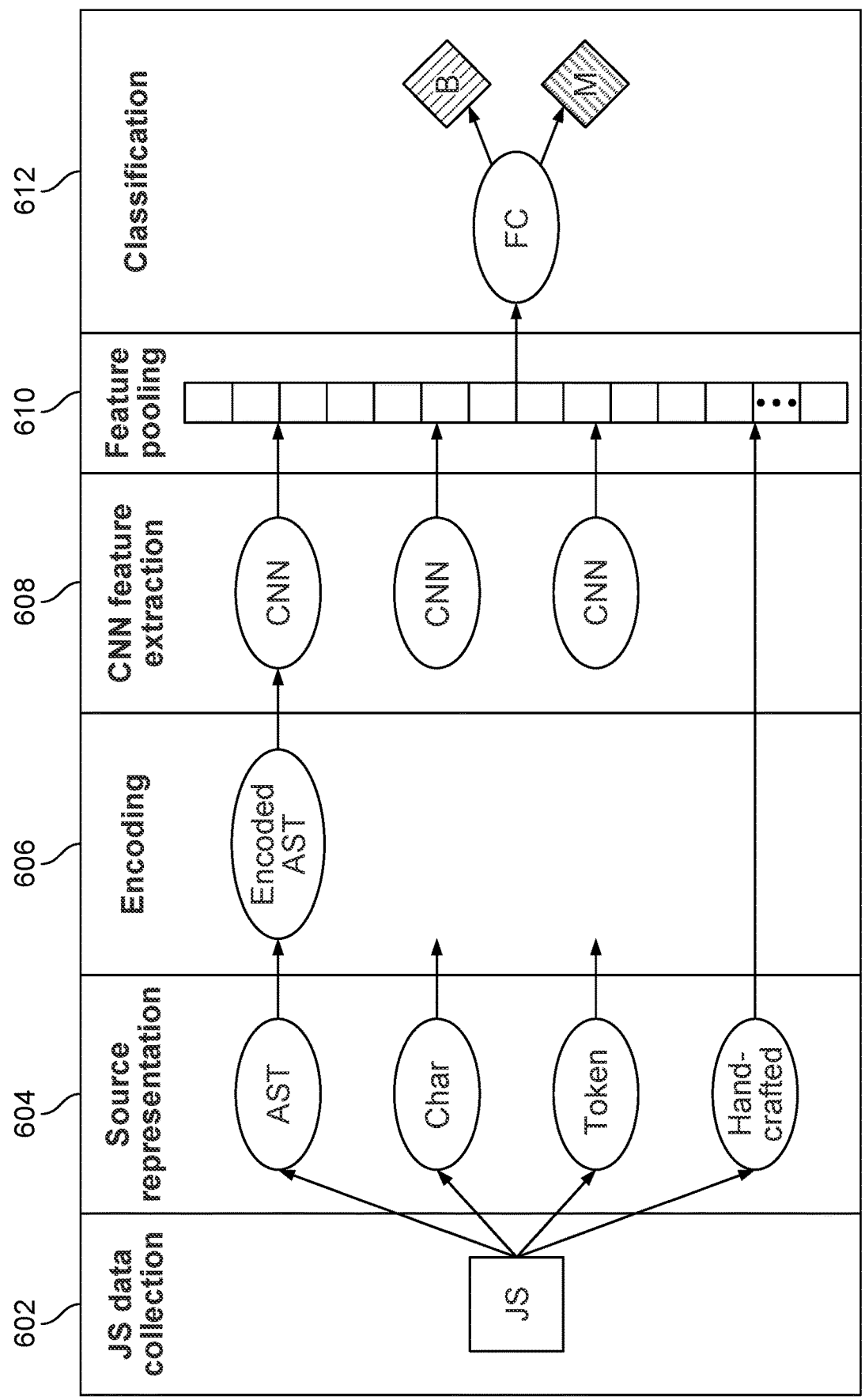
FIG. 6A is a diagram of a high-level architecture of a system for performing multi-representational learning applied to malware classification in accordance with some embodiments.

B. System Embodiments for Performing Multi-Representational Learning Applied to Malware Classification FIG. 6A is a diagram of a high-level architecture of a system for performing multi-representational learning applied to malware classification in accordance with some embodiments. As shown at 602, an input is a JavaScript (JS) source code file. At 604, different source code representations are collected (e.g., the different representations of the JS source code file include an Abstract Syntax Tree (AST), characters (Char), tokens (Token), and (optionally) hand-crafted features as shown in this example, and such as similarly described above with respect to FIG. 5).

At 606, the source representations are then encoded prior to being fed into a feature extraction model, which, in this example, is a Convolutional Neural Network (CNN) feature extraction model as shown at 608. The CNN feature extraction processing includes automatically learning features on the various data representations that were provided to it. In an example implementation, a CNN architecture for this purpose is implemented with parallel convolutional layers. The activation map of each filter undergoes global max pooling to become a single point of maximum activation.

As shown at 610, these resulting features are then all concatenated together in a feature pooling operation to form a vector (e.g., a feature vector). In an example implementation, the feature vector is of constant size regardless of the size of the original data representation. In this way, each filter can be thought of as an independent "soft" pattern detector. Specifically, each activation map feature vector is then concatenated together in to form a conglomerative feature vector also of constant size that is equal to the number of filters in each parallel convolutional layer. In an example implementation, the disclosed system and process for generating/building these MRL model(s) for static classification of malicious source can be implemented using an open source machine learning platform, such as TensorFlow (TF) (e.g., available at https://www.tensorflow.org/). As shown at 612, the actual classification on this feature vector can be performed statically on the JS sample to determine if it is malicious or benign.

Figure 6B:
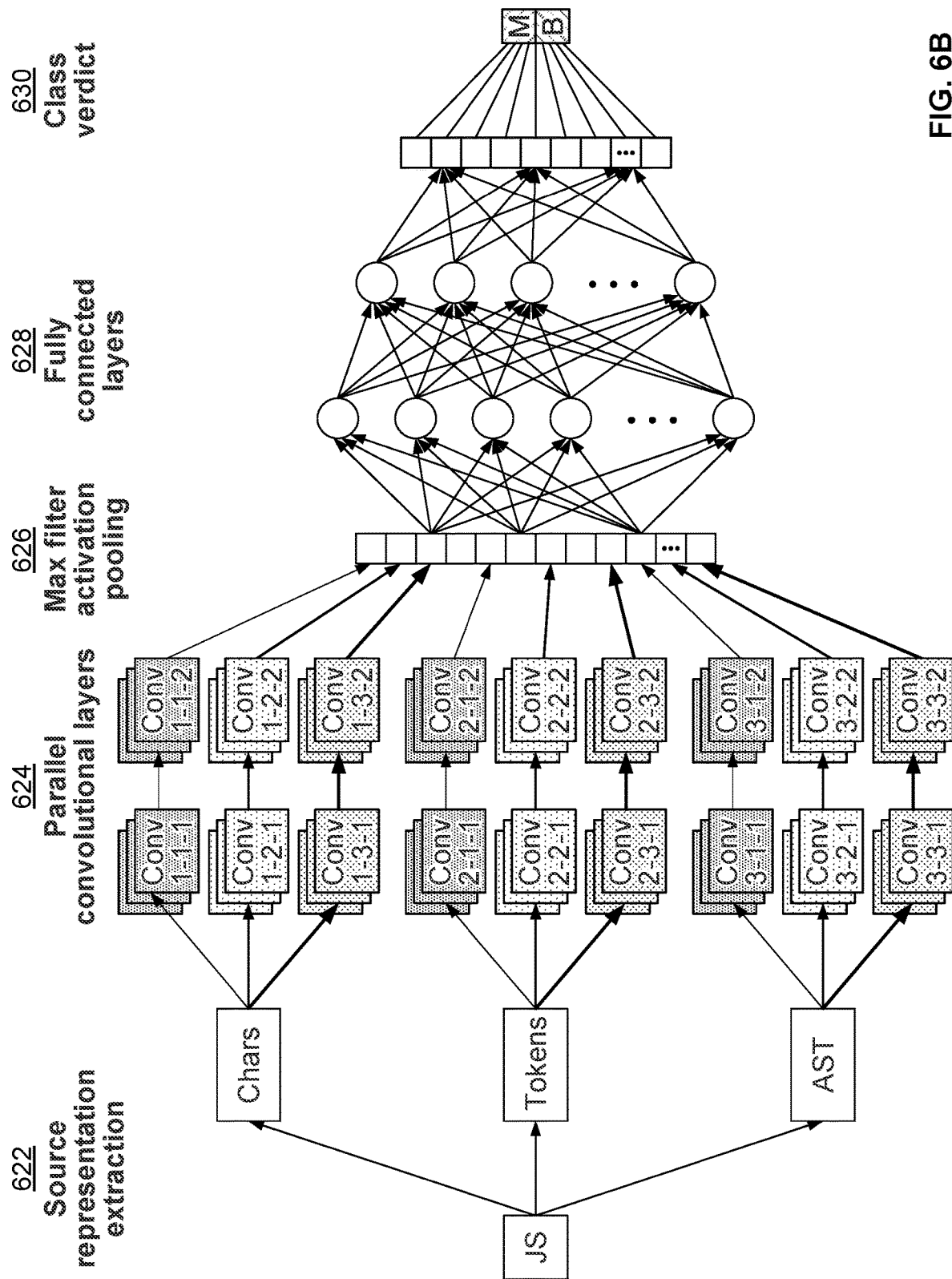
FIG. 6B is another diagram of a high-level architecture of a system for performing multi-representational learning applied to malware classification in accordance with some embodiments.

FIG. 6B is another diagram of a high-level architecture of a system for performing multi-representational learning applied to malware classification in accordance with some embodiments. As shown at 622, a source code representation includes an input, which is a JavaScript (JS) source code file, and then different source code representations of that input (e.g., the different representations of the JS source code file include AST, Char, and Token as shown in this example, and such as similarly described above with respect to FIG. 5). The source representations are then encoded prior to being fed into a feature extraction model, which is a Convolutional Neural Network (CNN) feature extraction model as shown at 624. The CNN feature extraction processing includes automatically learning features on the various data representations that were provided to it. In an example implementation, a CNN architecture for this purpose is implemented with parallel convolutional layers as shown in FIG. 6B. The activation map of each filter undergoes global max pooling to become a single point of maximum activation. These resulting features are then all concatenated together a max filter activation pooling processing operation to form a vector (e.g., a feature vector) as shown at 626. In this example, the feature vector is of constant size regardless of the size of the original data representation. As such, each activation map feature vector is then concatenated together to form a conglomerative feature vector also of constant size that is equal to the number of filters in each parallel convolutional layer. These MRL model building operations can be implemented using open source tools, such as SKLearn (e.g., available at https://pypi.org/project/sklearn/). At 628, the above system processing can be performed on fully connected layers (training end-to-end) as shown and/or training an independent ensemble algorithm on top of the learned CNN features can also be performed (e.g., implemented using an open source ensemble tool, such as XGBoost, available at https://github.com/dmlc/xgboost). At 630, the actual classification on this feature vector can be performed statically on the JS sample to provide a class verdict on whether it is malicious or benign (e.g., a resulting score, such as between 0 and 1, and then compared to a malicious verdict threshold, such as likely malicious if exceeds a tuned malicious threshold value, such as further described below).

Figure 7A:
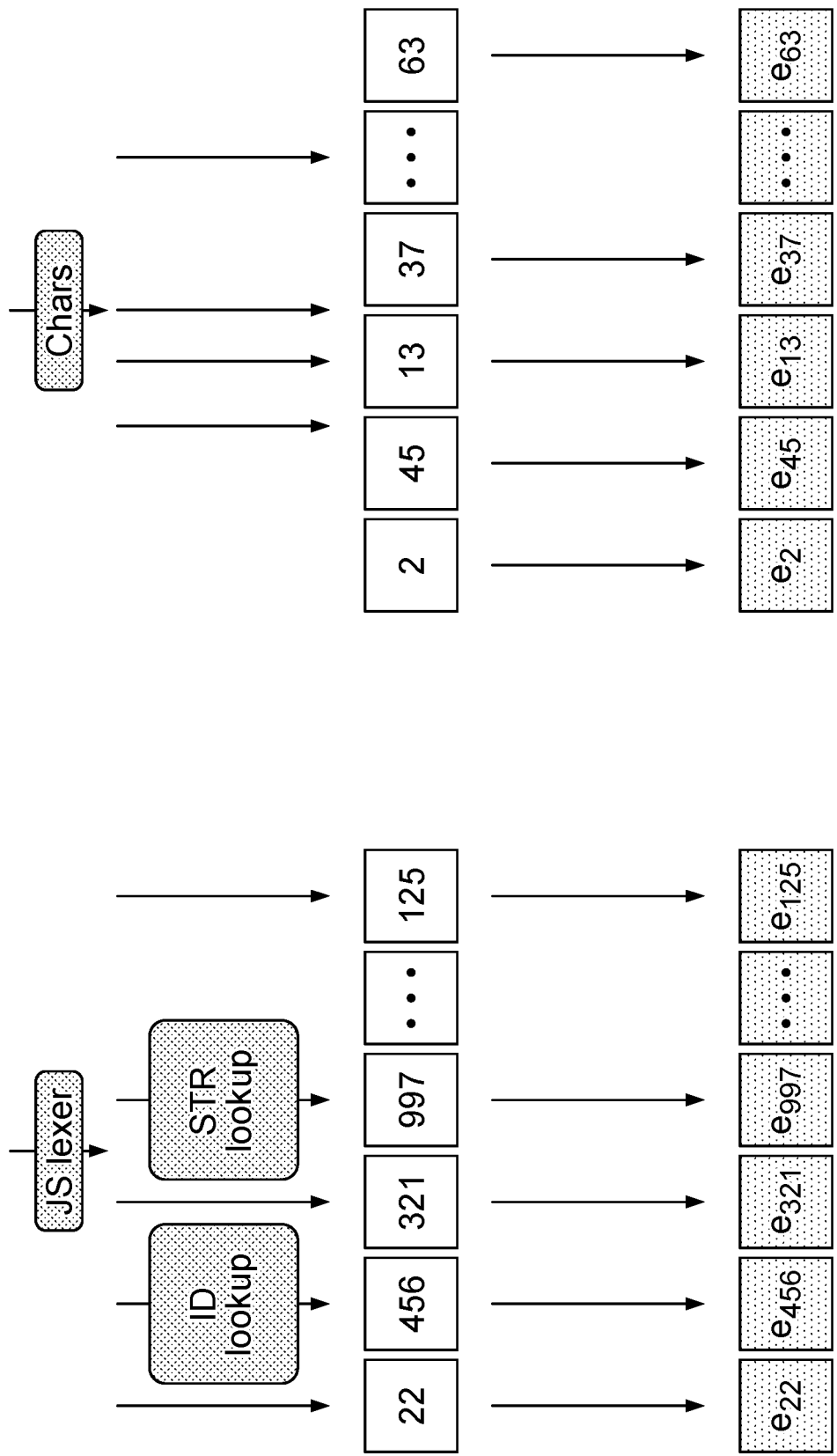
FIG. 7A illustrates an example of token and character encoding in accordance with some embodiments.

FIG. 7A illustrates an example of token and character encoding in accordance with some embodiments. As shown in FIG. 7A, encoding sequences of tokens and characters is performed by associating each possible token/character (char) with a unique integer class. In an example implementation, for tokens, we also compute all the strings and IDs which occurred in at least 2% of our benign and malicious datasets separately. We added these frequent strings and IDs into our representation by giving them their own unique class. In an example implementation, for chars, we assigned a unique integer class to the first 128 ASCII characters. In the first layer of the CNN, for each source representation and each unique integer class, we can then learn an associated embedded vector. This maps the integer classes into a real-valued high-dimensional vector space from which relationships between classes can be expressed and utilized.

Figure 7B:
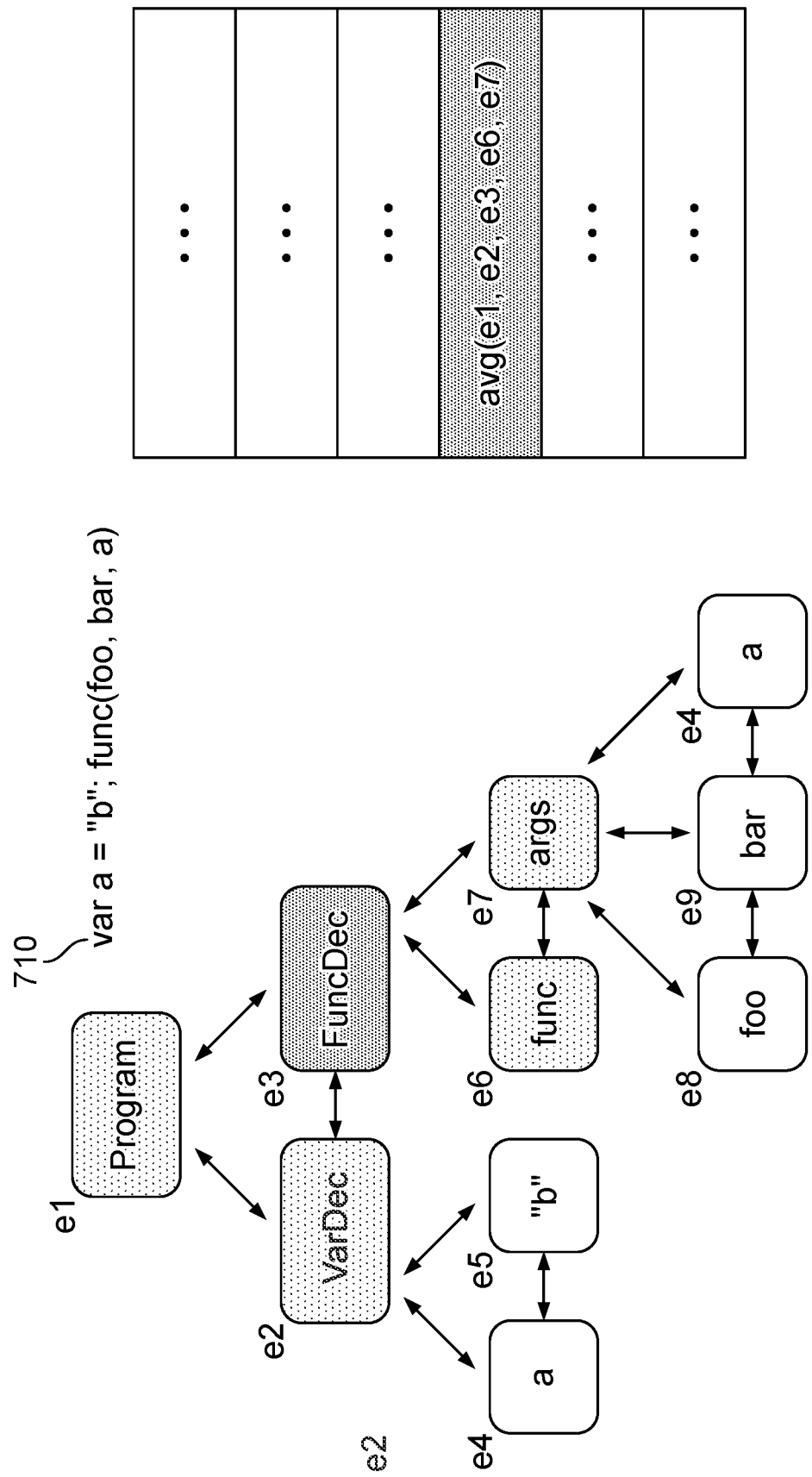
FIG. 7B illustrates an example of AST encoding in accordance with some embodiments.

FIG. 7B illustrates an example of AST encoding in accordance with some embodiments. As shown in FIG. 7B, in including the AST, we generally utilize AST to generate features on the abstract grammatical structure of the program. To achieve this, we consider the AST to be a bidirectional graph, where each node has a connection to its parent, children, and immediate siblings. As shown in FIG. 7B, example node types for JS source code of a program that includes an example line in the source code (e.g., var a="b"; func(foo, bar, a) as shown at 710) include the following nodes: a program node (Program), variable declaration nodes (VarDec), function declaration nodes (FuncDec), function related nodes (func and args), and leaf nodes (foo, bar, a) (e.g., function names, strings, etc.), which are structured in a tree. We generally want to compute convolutions over "neighborhoods" in the graph to generate features. As such, in this example, we assign each node type its own unique integer class and associated learned embedding vector. In the embedding layer, each entry in the encoded result represents an average of embedded vectors in the neighborhood surrounding the node. In an example implementation, neighborhoods are ordered in a Breadth First Search (BFS) fashion which brings us to a sequence of average embedded vectors per neighborhood in the tree (e.g., to effectively abstract features/capture a structure in a tree of the grammatical structure of the JS source code/program). In an example implementation, all of these operations are vectorized, though not shown here for brevity.

Figure 8:
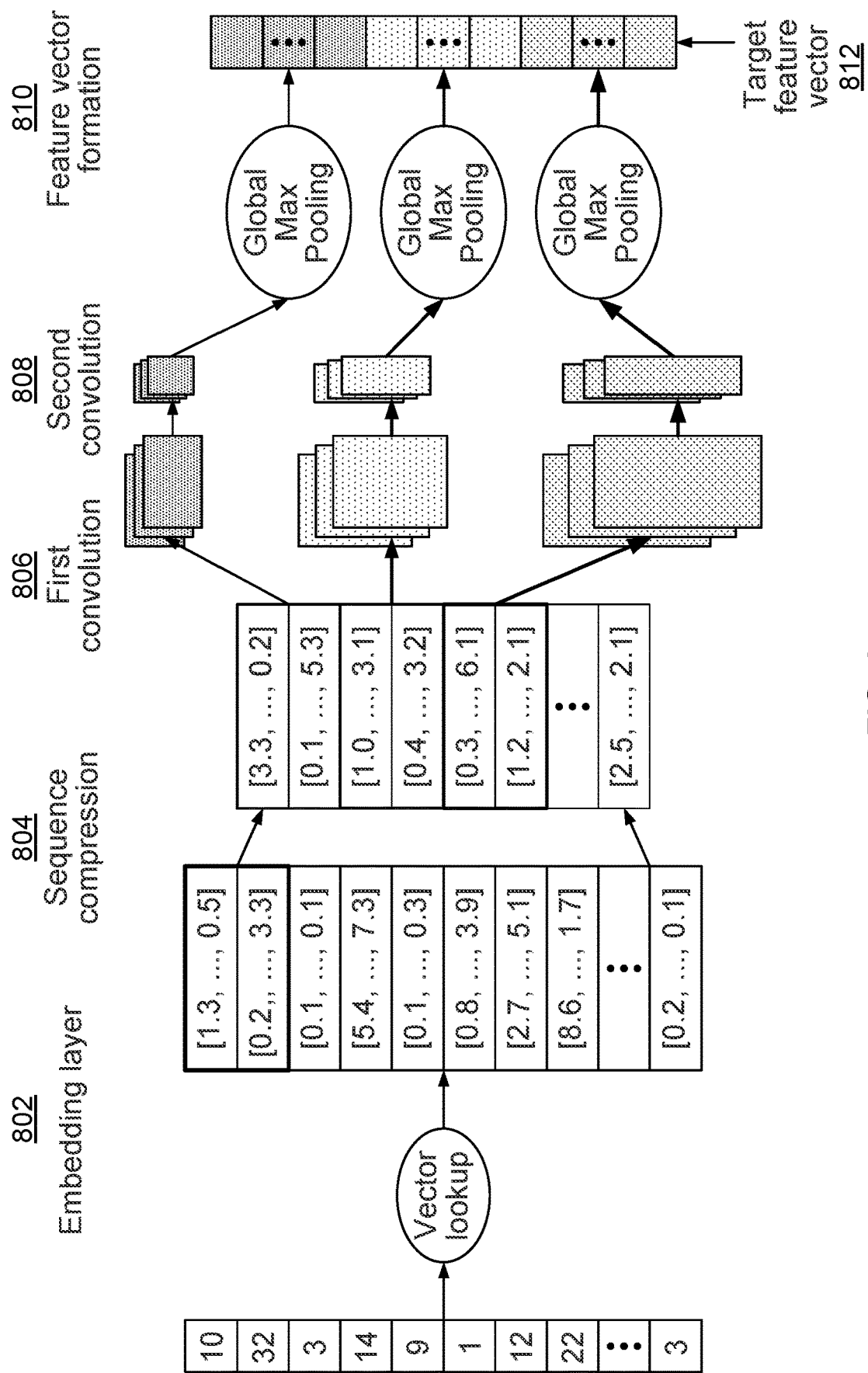
FIG. 8 illustrates an example of the feature learning layers in accordance with some embodiments.

FIG. 8 illustrates an example of the feature learning layers in accordance with some embodiments. Specifically, FIG. 8 illustrates what each parallel CNN generally looks like. After the embedded vector lookup at embedding layer operation 802, we are bringing the input into 2D. At a sequence compression operation as shown at 804, the input then undergoes an average pooling where every k embedded vectors are element-wise averaged together to form a new embedded vector containing information from all of them. This significantly improves the speed and memory consumption of the network, but also has a regularization effect where some of the lowest level detail is lost. At a first convolution operation as shown at 806, we perform 1D convolutional operations on the compressed sequence of embedded vectors by setting the filter width to be equal to the embedded vector size. We can vary the height of the filters in parallel layers to capture different lengths of the input at once. At a second convolution operation as shown at 808, a second "deep" layer of convolution (e.g., to extract deep features) over that layer's output is performed to extract more expressive and nonlinear features (e.g., a second layer of convolution may be used for every parallel layer). At a feature vector formation operation as shown at 810, each final activation map goes through a global max pooling processing operation as similarly described above and all of the filter's max activations are pooled together to form the target feature vector 812 (e.g., a fixed size feature vector to facilitate classification of JS source code samples using the feature vector as further described below).

Figure 9:
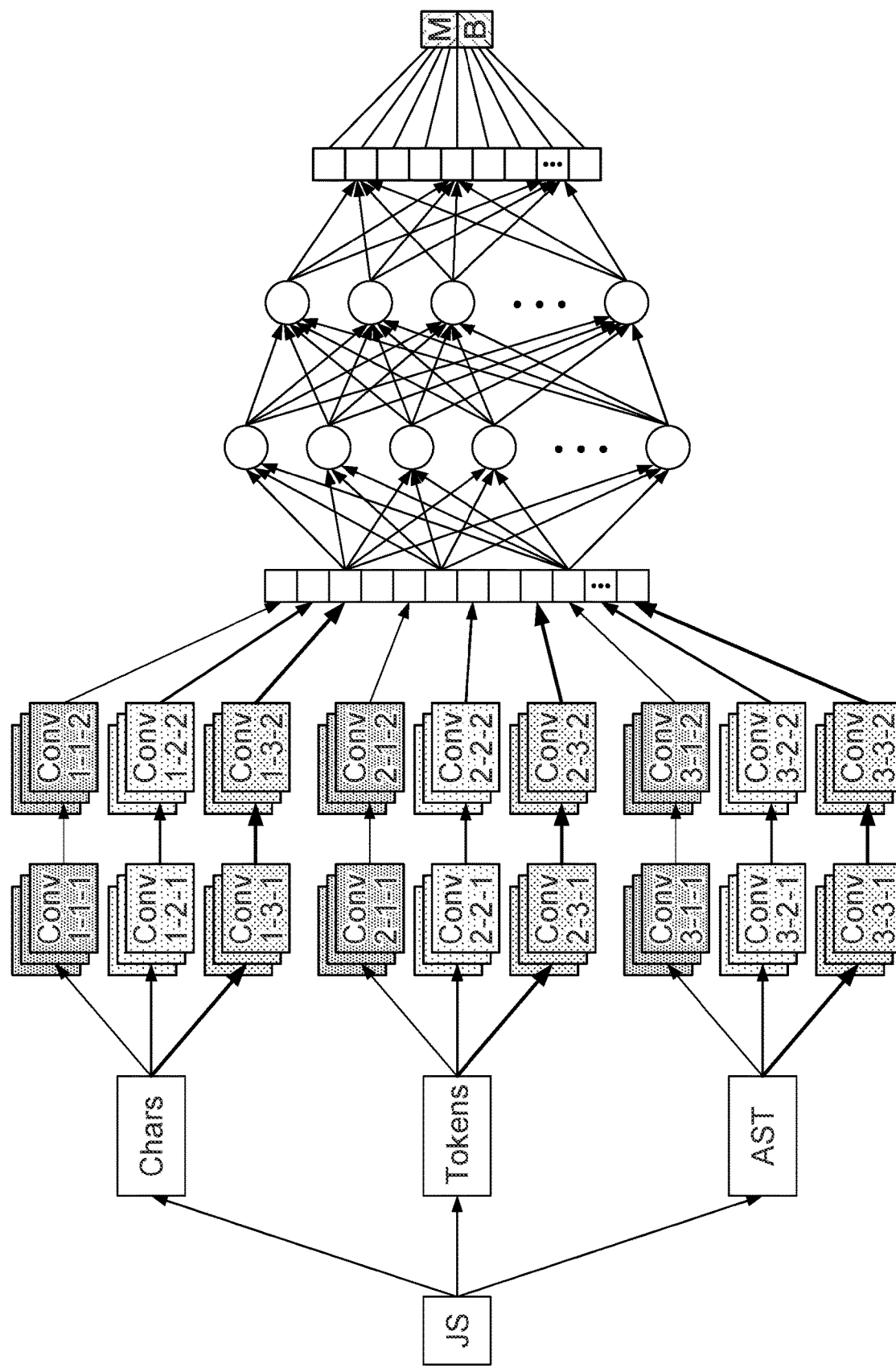
FIG. 9 illustrates an abstraction of the full model with fully connected layers for performing multi-representational learning applied to malware classification in accordance with some embodiments.

FIG. 9 illustrates an abstraction of the full model with fully connected layers for performing multi-representational learning applied to malware classification in accordance with some embodiments. In an example implementation, this model architecture can be trained end-to-end on a single training/validation split. In this example, we send each embedded vector matrix for each source representation through a forced normalization step (e.g., as a static Tensor Flow (TF) operation during both training and testing, in which the generating/building of the disclosed MRL model(s) for static classification of malicious source can be built implemented using TF). This ensures the values of each dimension of the embedded vectors across all embedded vectors have zero mean and unit variance. This generally leads to much faster convergence and better discovered solutions in the same way that normalizing images does. We utilize a variant of batch normalization called batch renormalization that accommodates exceedingly small batches immediately following the global max pooling operations (e.g., in this example, we used relatively small batch sizes due to limited GPU memory and exceedingly large JS files). This ensures all extracted features are properly normalized. We also utilize dropout in every fully connected layer (e.g., after batch normalization) to help with overfitting (e.g., it is generally desirable to order batch norm and dropout in this manner, given that recent research has explored the disharmonious effect of having that order reversed). There are many hundreds of hyperparameters here in this general architecture. Grid search is generally not feasible due to the significant time it generally takes to train these models. In this example implementation, we utilize a Bayesian hyperparameter search algorithm to provide quality suggestions of hyperparameter settings (e.g., implementing a hyperparameter optimization procedure that is based on an objective function to maximize the true positive rate (TPR), also known as Recall, at a thresholded target false positive rate (FPR); target FPRs for malicious JS detection should typically be ultra-low, for example, a FPR of 0.01% or lower, which optimizes the model to maximize the TPR while constrained to provide for an ultra-low FPR in a typical operating environment for classification of malware source code based on the static analysis). When we substitute the final fully connected layers for an ensemble algorithm, we split our data in half to train our feature extraction and classification code separately to avoid biasing the ensemble. As such, in this example implementation, one half of the training data is used to train all of the CNN feature extractors independently with a single linear decision boundary layer at the end. In this way, each CNN is tasked with discovering linearly separating features independent of everything else.

In an example implementation, training data and validation data were used to train and to validate the model (e.g., approximately 80% of the JS sample data was used for training of the model and approximately 20% of the JS sample data (non-overlapping sample data sets) was used for validation of the model after the training stage, and in an example implementation, a class ratio of malicious to benign samples for training data is approximately 50:50; while, for validation data, the class ratio is approximately 1:100 in order to accurately measure the TPR at an ultra-low FPR). In this example implementation, a preprocessing step is performed to implement a threshold on file size to ignore files that may be too small to make a reliable benign/malicious determination. For instance, many malicious samples are from simple droppers that drop malicious content. Dropper functionality by itself is generally not malicious. With respect to the JS functionality, that is generally a mislabeled sample. It is typically not possible to know without more advanced and expensive analysis whether what the JS drops is malicious or not. As such, in this example implementation, if a JS sample comes in that falls below either a char or token threshold, then we default to benign with the expectation that we would detect the payload instead of the dropper to avoid unnecessary FPs.

Figure 10A:
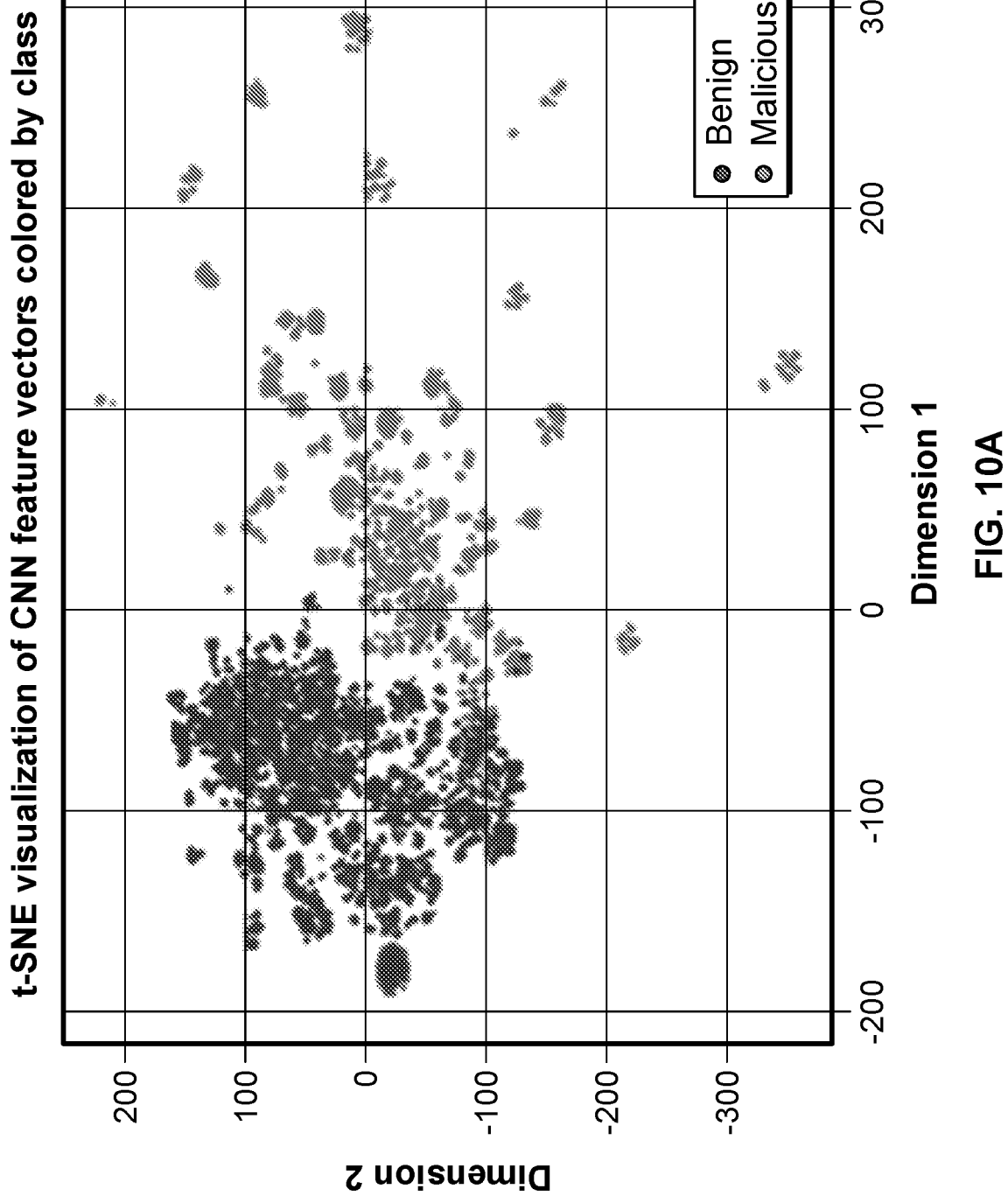
FIGS. 10A-10B illustrate a visualization of the CNN feature vectors and the hand-crafted feature vectors.
Figure 10B:
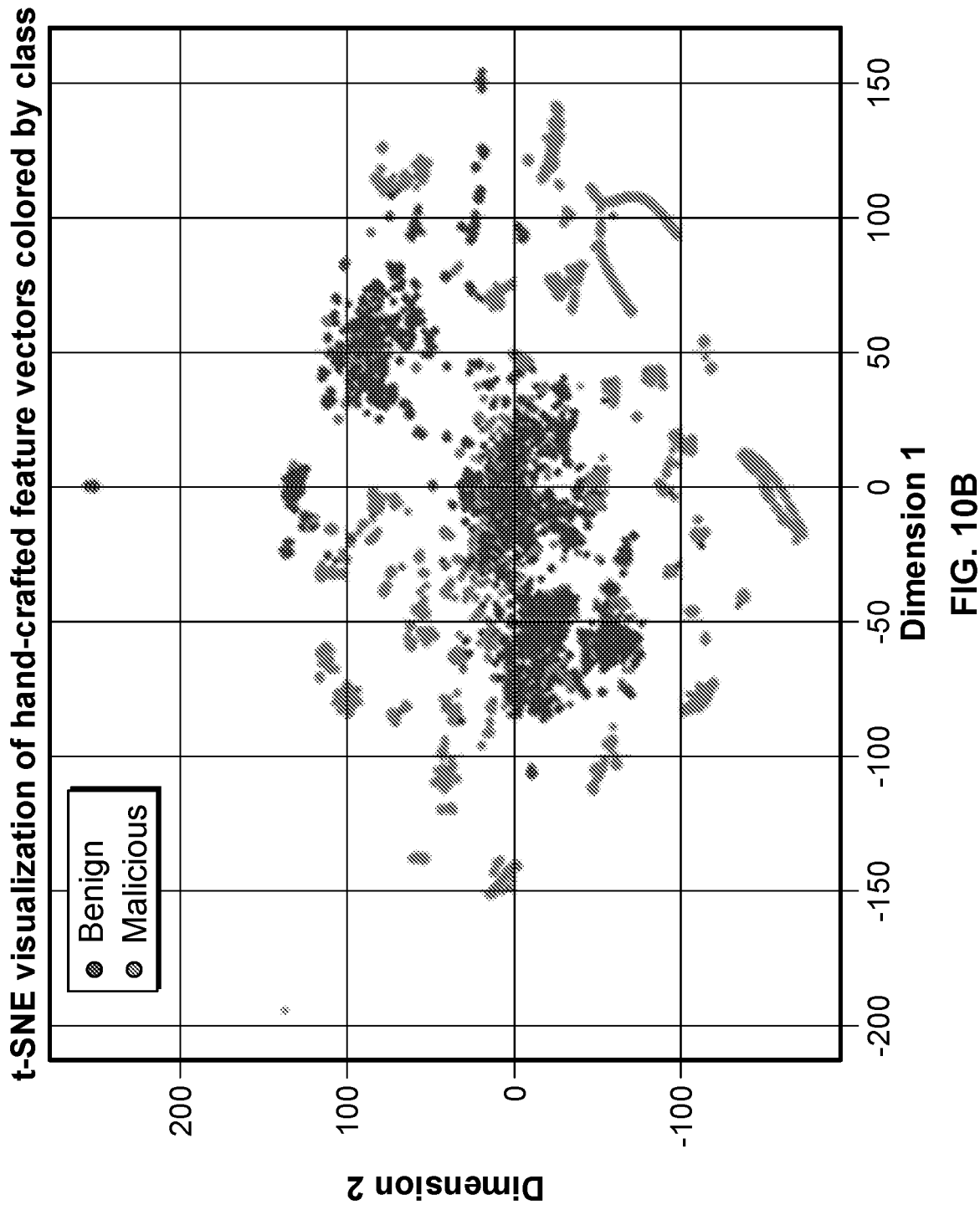

FIGS. 10A-10B illustrate a visualization of the CNN feature vectors and the hand-crafted feature vectors. Specifically, FIG. 10A illustrates a visualization of the CNN feature vectors colored by class, and FIG. 10B illustrates a visualization of the hand-crafted feature vectors colored by class. More specifically, these are feature vectors of JS plotted with a high-dimensional data visualization algorithm known as t-SNE. Each dot in these plots is a JS file that has been vectorized according to learned features of token encodings on the left and hand-crafted features on the right. The dots are colored by their class. Blue dots are benign files and red dots are malicious files. These two plots represent the same data and this is not data that the CNN we used was trained on. We can see in FIG. 10A that the learned features are able to linearly separate our classes (e.g., the MRL model is specifically tuned to separate malicious and benign classes of source code malware, which is apparent in FIG. 10A) in contrast to hand-crafted features, which have no such interpretation (e.g., as the malicious and benign classes of source code malware are not visually separated in this example visualization as shown in FIG. 10B). We ended up seeing a linear decision boundary for each source representation in this type of plot. The features from each source representation achieve this separation in very different ways, which motivates us to combine their strengths with a subsequent classification process on top of all of them.

Below is a list of five example hand-crafted feature vectors.

1. "maliciousjspattern"

This hand-crafted feature vector calculates the number of occurrences of malicious RegEx patterns explicitly as identified by cybersecurity experts. Some examples of explicit patterns searched for in the JS script are:
'\.Exec\s*?\(|\.Execute\b|\.run\s*?\(|\.FileSystemObject'
'\.Regwrite\s*?\(|\.RegRead\s*?\(|\.RegDelete\s*?\(|[\'\"]?~HKCU\\'
'\bunescape\(\s*?[\'\"]\s*?\%[\w\d]{2}\%[\w\d]{2}'
'\bdocument\.write\(\s*?unescape\(\s*?[\'\"]\%[\w\d]{2}\%[\w\d]{2}|\bdocument\.writeln\(\s*?unescape\(\s*?[\'\"]\%[\w\d]{2}\%[\w\d]{2}'
'\beval\(\s*?unescape\('

The total count of malicious RegEx pattern matches is then divided by the total number of characters in the script for normalization purposes.

2. "kwException"

This is simply the number of exception handling tokens present in the script expressed as a percentage of the total token count. The relevant keywords are "try", "catch", "finally" and "throw".

3. "onEvent"

This is the number of event handling tokens present in the script expressed as a percentage of the total number of name tokens, including all variable and function names in the script. The name tokens searched for are "onerror", "onload", "onbeforeunload" and "onunload".

4. "ActiveXObject"

This is the number of ActiveXObject calls expressed as a percentage of the total number of name tokens in the script. The name token searched for is "ActiveXObject".

5. "executable"

This is the number of ".exe" and ".bat" occurrences in the script expressed as a percentage of the total character count.

FIG. 11 is a table illustrating the false negative rates on a test set for the generated model for performing multi-representational learning applied to malware classification of JavaScript samples in an example set of test data. Specifically, this table illustrates results explicitly testing our original hypothesis that combining features from different source representations (e.g., abstraction layers) benefits performance for static classification of source code malware. Similarly, thresholding False Positive Rate (FPR) and measuring False Negative Rate (FNR) tells a story of better performance as we combine feature sources compared to when they are considered in isolation. For each combination of source representations, we did a full auto hyperparameter tuning to discover the optimal model hyperparameters that maximize the potential performance with that source representation. We see at all levels of thresholded FPR (e.g., FPR of 0.01% FPR or lower); the FNRs are lower as we combine features. No significant difference was discovered upon including hand-crafted features to the CNN generated features, thus we discarded them for an example implementation of a production MRL model.

Figure 12:
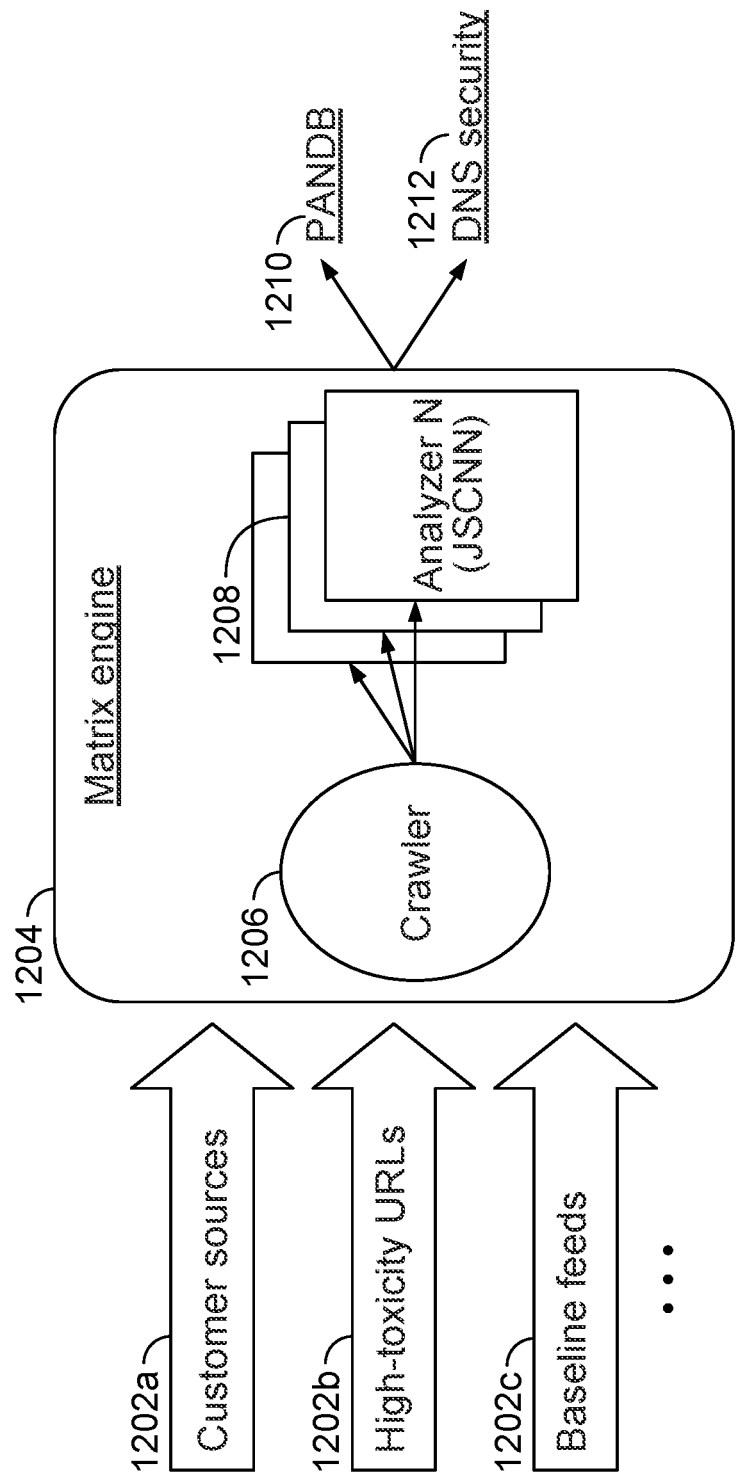
FIG. 12 is a diagram of a system architecture for a proactive URL analysis crawler in accordance with some embodiments.

FIG. 12 is a diagram of a system architecture for a proactive URL analysis crawler in accordance with some embodiments. Web pages often include JavaScript (JS) source code. Malware domains can often include malware JS content on one or more web pages. Accordingly, the disclosed techniques for multi-representational learning applied to malware classification can be implemented to provide for a proactive Uniform Resource Link (URL) analysis crawler to detect URLs that include malicious JS source code as content.

Referring to FIG. 12, various inputs include customer sources of URLs 1202a, high-toxicity URLs 1202b, and baseline feeds of URLs 1202c, which is provided as input into a Matrix Engine 1204. Matrix Engine 1204 includes a web crawler 1206 to crawl and parse the URL input to extract JS samples from each of sources 1202a-c and an Analyzer component 1208 (e.g., a JS CNN analyzer implemented using the disclosed techniques for generating an MRL model for static classification of JS as malware or benign). Analyzer 1208 performs static analysis and classification of the extracted JS samples to provide verdicts for each of the JS samples. If the verdict is malware, then the malware results for such associated URLs can be provided to a security data store (e.g., PANDB, which is a commercially available URL filtering solution available from Palo Alto Networks, Inc. of Santa Clara, Calif.) as shown at 1210. Similarly, if the verdict is malware, then the malware results for such associated URLs can also be provided to a DNS Security solution (e.g., and/or to a malware domain list) as shown at 1212.

Referring again to FIG. 1, the disclosed JS CNN analyzer implemented using the disclosed techniques for generating an MRL model for static classification of source code as malware or benign can be similarly implemented as components of security platform 122 (e.g., and as further described below, can similarly be implemented as components of data appliance 102 and/or as components of security software/agents executed on client devices, such as client 110). For example, model builder 152 (e.g., implemented using a set of open source tools and/or scripts authored in an appropriate language such as python, Acorn, SKLearn, XGBoost, such as described herein) and storage 142 can be used to build an MRL model for static classification of source code as malware or benign. In various embodiments, model builder 152 generates models (e.g., MRL model for static classification of source code, for one or more scripting/ programming languages, as malware or benign) on a daily (or other applicable/periodic) basis. Analyzer & detector 154 can receive source code samples (e.g., JS code samples) and process the source code samples based on the generated MRL model(s) for static classification and determine a class verdict of malicious or benign and the action to be performed based on a security policy/rules, such as further described below.

Referring again to FIG. 4, the disclosed JS CNN analyzer implemented using the disclosed techniques for generating an MRL model for static classification of source code as malware or benign can be similarly implemented as components of threat engine 244 of data appliance 102. For example, as session packets corresponding to a file are received by threat engine 244, decoder 402 detects JS code and extracts a source code sample(s) 404. Each source code sample (e.g., JS source code sample or HTML source code sample) is processed by analyzer(s) 406 (e.g., a JS CNN analyzer implemented using the disclosed techniques for generating an MRL model for static classification of JS as malware or benign). Detector 408 receives results from Analyzer(s) 406 and determines an action to perform based on a security policy (e.g., based on rules/policies in policies 252 as shown in FIG. 2B). Depending on the operating/computing environment and available resources, the disclosed JS CNN analyzer implemented using the disclosed techniques for generating an MRL model for static classification of source code as malware or benign can be implemented to scale down to a computing environment with less resources than would typically be available in a cloud computing/server environment (e.g., limit number of source code representations therefore reducing the total number of models contained inside the MRL instance, set a hard threshold on length of source code representation sequences sent to CNNs to reduce the total amount of memory used and computation performed, use a higher degree of sequence compression in the CNNs to reduce the total amount of memory used and computation performed, and set constraints on the hyperparameter selection procedure during the hyper optimization process to limit the size of the CNN and/or XGB models operating in memory, e.g., to reduce the number and/or size of the filters, the number of trees, etc. to scale the models to the available resources in the operating computing environment for deployment).

In some cases, a given file type is specified within the file's header (e.g., as a magic number appearing in the first seven bytes of the file itself). In such a scenario, threat engine 244 can select an appropriate model corresponding to the specified file type (e.g., based on a table provided by security platform 122 that enumerates file types and corresponding models). In other cases, such as JavaScript, the magic number or other file type identifier (if present in the header at all) may not be probative of which classification model should be used. As one example, JavaScript would have a file type of "textfile." To identify file types such as JavaScript, decoder 402 can be used to perform deterministic finite state automaton (DFA) pattern matching and apply heuristics (e.g., identifying <script> and other indicators that the file is JavaScript). The determined file type and/or selected classification model are saved in the session state. The file type associated with a session can be updated as the session progresses, as applicable. For example, in a stream of text, when a <script> tag is encountered, the JavaScript file type can be assigned for the session. When a corresponding </script> is encountered, the file type can be changed (e.g., back to plaintext).

As will now be apparent to one of ordinary skill in the art in view of the disclosed embodiments, the disclosed techniques for generating an MRL model for static classification of source code as malware or benign can be applied in various other security solutions and/or security services.

Figure 13:
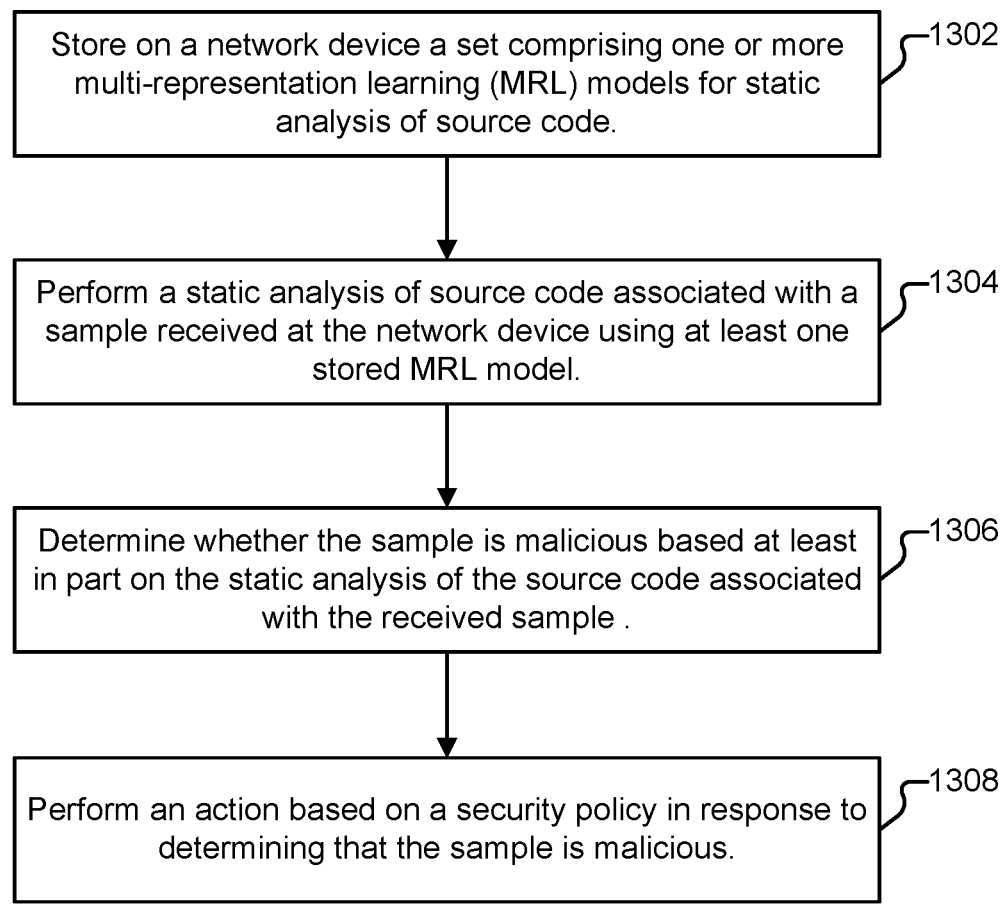
FIG. 13 illustrates an example of a process for performing static analysis of source code samples using multi-representational learning models for malware classification in accordance with some embodiments.

C. Process Embodiments for Performing Multi-Representational Learning Applied to Malware Classification FIG. 13 illustrates an example of a process for performing static analysis of source code samples using multi-representational learning models for malware classification in accordance with some embodiments. In some embodiments, process 1300 is performed by security platform 122, and in particular by analyzer and detector 154. For example, analyzer and detector 154 can be implemented using a script (or set of scripts) authored in an appropriate scripting language (e.g., Python). In some embodiments, process 1300 is performed by data appliance 102, and in particular by threat engine 244. For example, threat engine 244 can be implemented using a script (or set of scripts) authored in an appropriate scripting language (e.g., Python). In some embodiments, process 1300 can also be performed on an endpoint, such as client device 110 (e.g., by an endpoint protection application executing on client device 110).

Process 1300 begins at 1302 when a set comprising one or more multi-representation learning (MRL) models for static analysis of source code are stored on a network device. For example, the MRL models, such as for JS code, HTML code, and/or other programming/scripting languages, can be generated (e.g., and/or periodically updated/replaced) based on training and validation data using the above-described techniques.

At 1304, a static analysis of source code associated with a sample received at the network device is performed using at least one stored sample classification model. As one example of the processing performed at 1304, such as for data appliance 102 and/or client device 110, for a given session, an associated protocol decoder can call or otherwise make use of an appropriate file-specific decoder when the start of a file is detected by the protocol decoder. As explained above, the file type is determined (e.g., by decoder 402) and associated with the session.

At 1306, whether the sample is malicious based at least in part on the static analysis of the source code associated with the received sample is determined. In an example implementation, the appropriate MRL model (e.g., applying an MRL model for JS code for a JS sample, applying an MRL model for HTML code for an HTML sample, etc.) is used to determine a class verdict for the file as malicious or benign (i.e., comparing the final value obtained using the MRL model against a maliciousness threshold, such as similarly described above).

At 1308, in response to determining that the sample is malicious, an action based on a security policy is performed. Specifically, an action is taken in response to the determination made at 1306. One example of a responsive action, such as for data appliance 102 and/or client device 110, is terminating the session. Another example of a responsive action, such as for data appliance 102 and/or client device 110, is allowing the session to continue, but preventing the file from being accessed and/or transmitted (and instead, being placed in a quarantine area). As yet another example of a responsive action, such as for security platform 122, is sending the determination that the sample is malicious to the subscriber that submitted the sample for analysis (e.g., data appliance 102 and/or client device 110) to inform that subscriber that the sample was determined to be malicious so that the subscriber can perform a response based on a locally configured security policy. In various embodiments, security platform 122, appliance 102, and/or client device 110 is configured to share its verdicts (whether benign verdicts, malicious verdicts, or both) with one or more other devices/platforms (e.g., security platform 122, appliance 102, and/or client device 110, etc.). As an example, when security platform 122 completes its independent analysis of the sample, it can use the verdict reported by appliance 102 for a variety of purposes, including assessing the performance of the model that formed the verdict.

In an example embodiment, security platform 122 is configured to target a specific false positive rate (e.g., 0.01%) when generating models for use by appliances such as data appliance 102. Accordingly, in some cases (e.g., one out of every one thousand files), data appliance 102 may incorrectly determine that a benign file is malicious when performing inline analysis using a model in accordance with techniques described herein. In such a scenario, if security platform 122 subsequently determines that the file is in fact benign, it can be added to a whitelist so that it is not subsequently flagged as being malicious (e.g., by another appliance).

Figure 14:
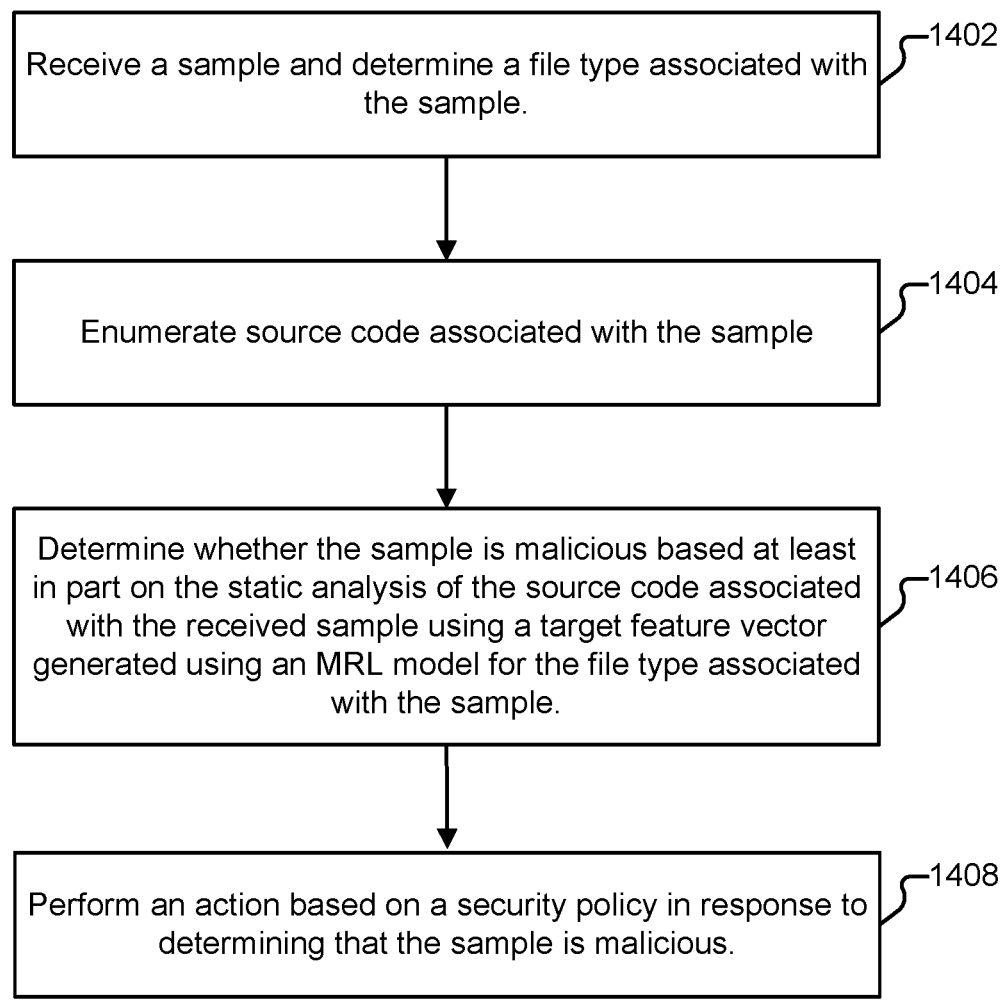
FIG. 14 illustrates another example of a process for performing static analysis of source code samples using multi-representational learning models for malware classification in accordance with some embodiments.

FIG. 14 illustrates an example of a process for performing static analysis of source code samples using multi-representational learning models for malware classification in accordance with some embodiments. In some embodiments, process 1400 is performed by security platform 122, and in particular by analyzer and detector 154. For example, analyzer and detector 154 can be implemented using a script (or set of scripts) authored in an appropriate scripting language (e.g., Python). In some embodiments, process 1400 is performed by data appliance 102, and in particular by threat engine 244. For example, threat engine 244 can be implemented using a script (or set of scripts) authored in an appropriate scripting language (e.g., Python). In some embodiments, process 1400 can also be performed on an endpoint, such as client device 110 (e.g., by an endpoint protection application executing on client device 110).

Process 1400 begins at 1402 when a sample is received and a file type associated with the sample is determined. For example, MRL models can be generated for various programming/scripting languages, such as for JS code, HTML code, and/or other programming/scripting languages, using the above-described techniques.

At 1404, source code associated with the sample is enumerated. As one example of the processing performed at 1404, based on the MRL model to be used for the source code associated with the sample, the source code can be enumerated into different layers of abstraction/representations, such as characters, tokens, ASTs, and/or other layers of abstraction as similarly described above (e.g., such as described above with respect to FIG. 5).

At 1406, whether the sample is malicious based at least in part on the static analysis of the source code associated with the received sample using a target feature vector generated using an MRL model for the file type associated with the sample is determined. In an example implementation, the appropriate MRL model (e.g., applying an MRL model for JS code for a JS sample, applying an MRL model for HTML code for an HTML sample, etc.) is used to determine a verdict for the file (i.e., comparing the final value obtained using the MRL model against a maliciousness threshold, such as similarly described above).

At 1408, in response to determining that the sample is malicious, an action based on a security policy is performed. Specifically, an action is taken in response to the determination made at 1406. One example of a responsive action, such as for data appliance 102 and/or client device 110, is terminating the session. Another example of a responsive action, such as for data appliance 102 and/or client device 110, is allowing the session to continue, but preventing the file from being accessed and/or transmitted (and instead, being placed in a quarantine area). As yet another example of a responsive action, such as for security platform 122, is sending the determination that the sample is malicious to the subscriber that submitted the sample for analysis (e.g., data appliance 102 and/or client device 110) to inform that subscriber that the sample was determined to be malicious so that the subscriber can perform a response based on a locally configured security policy. In various embodiments, security platform 122, appliance 102, and/or client device 110 is configured to share its verdicts (whether benign verdicts, malicious verdicts, or both) with one or more other devices/platforms (e.g., security platform 122, appliance 102, and/or client device 110, etc.). As an example, when security platform 122 completes its independent analysis of the sample, it can use the verdict reported by appliance 102 for a variety of purposes, including assessing the performance of the model that formed the verdict.

Figure 15:
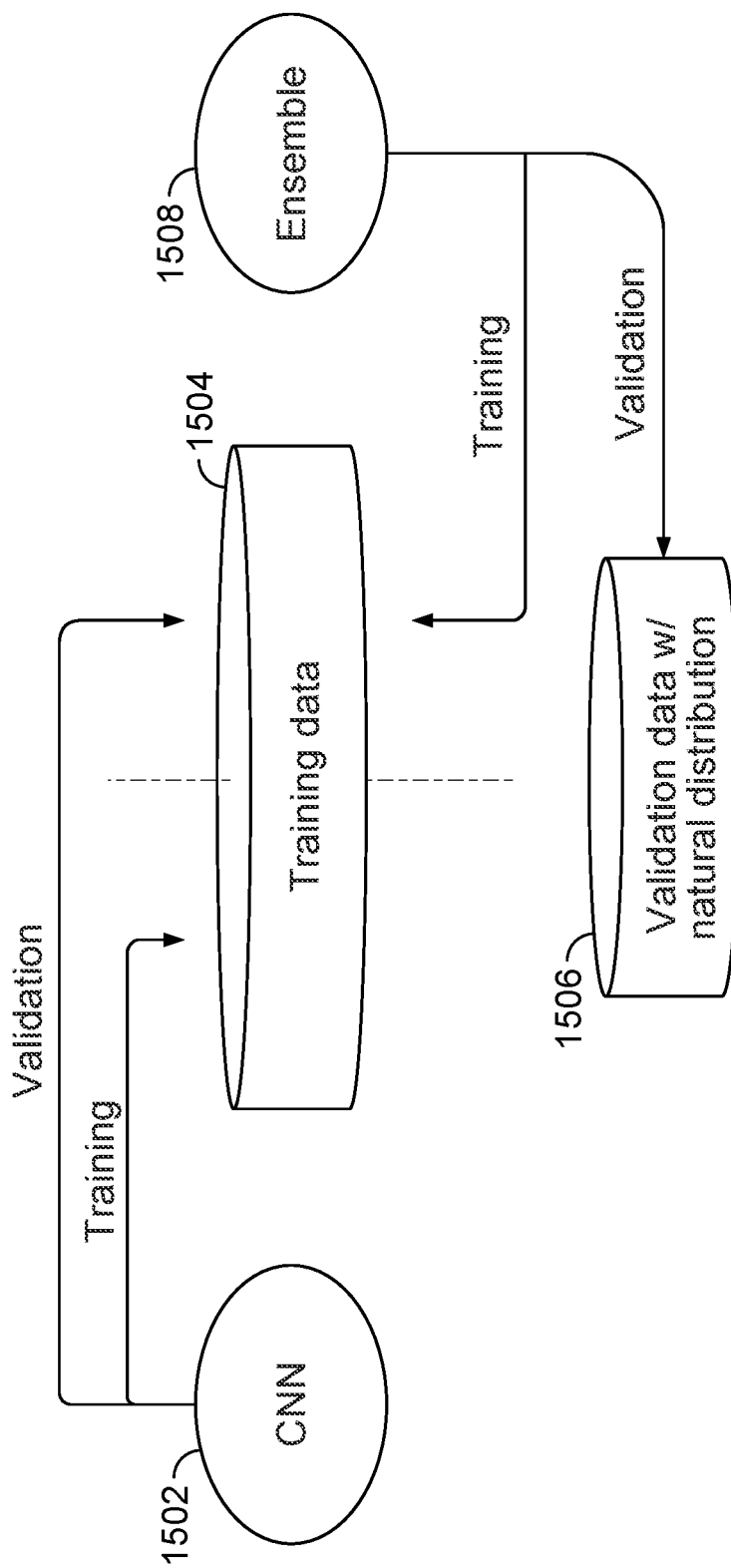
FIG. 15 is a diagram that illustrates a two phase training procedure for generating multi-representational learning models for malware classification in accordance with some embodiments.

VII. Building Multi-Representational Learning (MRL) Models for Static Analysis of Source Code Samples for Detecting Malicious Source Code FIG. 15 is a diagram that illustrates a two phase training procedure for generating multi-representational learning models for malware classification in accordance with some embodiments. FIG. 15 will be described below in conjunction with FIG. 16.

Figure 16:
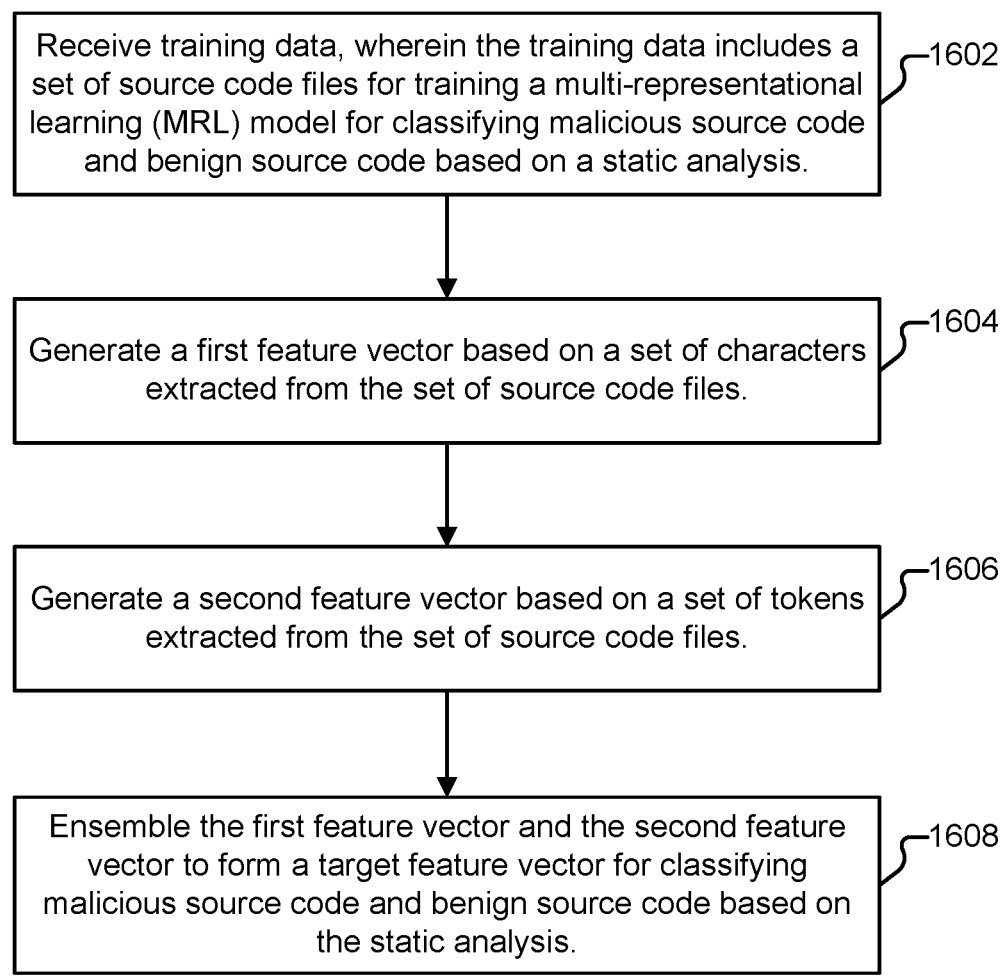
FIG. 16 is an example of a process for generating multi-representational learning models for malware classification in accordance with some embodiments.

FIG. 16 is an example of a process for generating multi-representational learning models for malware classification in accordance with some embodiments. Specifically, an example process for generating multi-representational learning (MRL) models for malware classification is depicted in FIG. 16. In various embodiments, process 1600 is performed by security platform 122.

Process 1600 begins at 1602 when training data, such as stored in training data store 1504 as shown in FIG. 15, (e.g., the training data includes a set of source code files) for training a multi-representational learning (MRL) model for classifying malicious source code and benign source code based on a static analysis is received.

At 1604, a first feature vector based on a set of characters extracted from the set of source code files is generated. As described above, various techniques are disclosed for generating this feature vector based on a set of characters extracted from the set of source code files.

At 1606, a second feature vector based on a set of tokens extracted from the set of source code files is generated. As described above, various techniques are disclosed for generating this feature vector based on a set of tokens extracted from the set of source code files. As similarly described above, additional feature vectors based on different levels/layers of abstraction can also be generated based on different representations to be extracted from the source code files.

At 1608, once the feature vectors are generated, the first feature vector and the second feature vector are assembled to form a target feature vector for classifying malicious source code and benign source code based on the static analysis. In one embodiment, the ensemble 1508 is trained using a distinct set of training data, which can also be stored in training data store 1504 as shown in FIG. 15, which illustrates that the training data is segmented into two distinct sets of training data. Finally, as similarly described above, the ensemble result can be validated using a set of validation data with natural distribution, such as stored validation data with natural distribution data store 1506 as shown in FIG. 15.

As similarly described above, various MRL models for one or more programming/scripting languages can be built using open source or other tools, and as applicable, performing hyperparameter tuning as described above, which can, for example, be tuned for efficiently performing these MRL models for static source code classification to be performed/executed on various computing environments that may have different computing resources (e.g., memory resources, processor/CPU resources, etc. available for processing these MRL models). Also, MRL models (e.g., generated by model builder 152 using process 1600) can be sent (e.g., as part of a subscription service) to data appliance 102, client device 110, and/or other applicable recipients (e.g., data appliances 136 and 148, etc.).

In various embodiments, model builder 152 generates MRL models (e.g., MRL models for one or more types of source code, that is, different programming/scripting languages, such as JS, HTML, etc.) on a daily (or other applicable/periodic) basis. By performing process 1600 or otherwise periodically generating models, security platform 122 can help ensure that the models used by appliances such as appliance 102 detect the most current types of malware threats (e.g., those most recently deployed by nefarious individuals).

Whenever a newly-generated MRL model is determined to be better than an existing model (e.g., as determined based on a set of quality assessment metrics exceeding a threshold), updated MRL models can be transmitted to data appliances such as data appliance 102. Such updates can be readily deployed to and adopted by appliances (e.g., as real-time updates). In some cases, such updates adjust the features themselves.

In one embodiment, the CNNs, such as stored in CNN data store 1502 as shown in FIG. 15 (e.g., one for chars, one for tokens, and one for ASTs, such as similarly described above), which extract features that are then concatenated together and sent to the ensemble for classification are trained independently of one another instead of as one big deep net. In an example implementation for classifying JS code samples, based on a targeted experiment, we determined that training them independently works significantly better—presumably due to its effect on reducing overfitting. As such, models with featured independently trained CNNs, in some cases, can be more effective for classifying source code malware, such as for JavaScript samples as similarly described above. As such, the first phase of the above-described two phase training process (in which CNNs are trained) can be similarly implemented to include training multiple CNNs independently (e.g., they can be trained simultaneously) instead of training one combined CNN. As also illustrated in FIG. 15, CNNs stored in CNN data store 1502 can be trained using a first set of training data stored in training data store 1504 and then validated using a distinct set of training data stored in training data store 1504.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive at a networked device a set comprising one or more multi-representation learning (MRL) models for static analysis of source code;
perform a static analysis of source code associated with a sample received at the network device, wherein performing the static analysis includes using at least one MRL model, wherein the sample is associated with a file, and wherein the at least one MRL model is selected, from the set of one or more MRL models, based on a file type associated with the file; and
determine that the sample is malicious based at least in part on the static analysis of the source code associated with the sample and without performing dynamic analysis of the sample, and in response to determining that the sample is malicious, perform an action based on a security policy; and
a memory coupled to the processor and configured to provide the processor with instructions.

2. The system of claim 1, wherein the processor is configured to enumerate the source code associated with the sample that comprises JavaScript and/or HTML.

3. The system of claim 1, wherein the processor is configured to enumerate the source code associated with the sample into a set of characters.

4. The system of claim 1, wherein the processor is configured to enumerate the source code associated with the sample into a set of characters and a set of tokens.

5. The system of claim 1, wherein the processor is configured to enumerate the source code associated with the sample into a set of characters, a set of tokens, and an Abstract Syntax Tree (AST).

6. The system of claim 1, wherein the processor is further configured to determine a file type associated with the file.

7. The system of claim 1, wherein the processor is further configured to receive at least one updated classification model.

8. The system of claim 1, wherein the processor is further configured to receive another MRL model for another programming language.

9. The system of claim 1, wherein the processor is further configured to transmit a copy of the received file to a security platform and perform the n-gram analysis while awaiting a verdict from the security platform.

10. A method, comprising:
receiving at a networked device a set comprising one or more multi-representation learning (MRL) models for static analysis of source code;
performing a static analysis of source code associated with a sample received at the network device, wherein performing the static analysis includes using at least one MRL model, wherein the sample is associated with a file, and wherein the at least one MRL model is selected, from the set of one or more MRL models, based on a file type associated with the file; and
determining that the sample is malicious based at least in part on the static analysis of the source code associated with the sample and without performing dynamic analysis of the sample, and in response to determining that the sample is malicious, performing an action based on a security policy.

11. The method of claim 10, further comprising enumerating the source code associated with the sample that comprises JavaScript and/or HTML.

12. The method of claim 10, further comprising enumerating the source code associated with the sample into a set of characters.

13. The method of claim 10, further comprising enumerating the source code associated with the sample into a set of characters and a set of tokens.

14. The method of claim 10, further comprising enumerating the source code associated with the sample into a set of characters, a set of tokens, and an Abstract Syntax Tree (AST).

15. The method of claim 10, further comprising determining a file type associated with the file.

16. The method of claim 10, further comprising receiving at least one updated MRL model.

17. The method of claim 10, further comprising receiving another MRL model for another programming language.

18. A computer program product embodied in a tangible computer readable storage medium and comprising computer instructions for:

receiving at a networked device a set comprising one or more multi-representation learning (MRL) models for static analysis of source code;

performing a static analysis of source code associated with a sample received at the network device, wherein performing the static analysis includes using at least one MRL model, wherein the sample is associated with a file, and wherein the at least one MRL model is selected, from the set of one or more MRL models, based on a file type associated with the file; and determining that the sample is malicious based at least in part on the static analysis of the source code associated with the sample and without performing dynamic analysis of the sample, and in response to determining that the sample is malicious, performing an action based on a security policy.

19. The computer program product recited in claim 18, further comprising computer instructions for enumerating the source code associated with the sample that comprises JavaScript and/or HTML.

20. The computer program product recited in claim 18, further comprising computer instructions for receiving at least one updated MRL model.

21. The computer program product recited in claim 18, further comprising computer instructions for receiving another MRL model for another programming language.

\* \* \* \* \*